United States Patent
Perrodin et al.

(10) Patent No.: US 12,306,069 B2
(45) Date of Patent: May 20, 2025

(54) ACOUSTIC DETECTION DEVICE AND SYSTEM WITH REGIONS OF INTEREST

(71) Applicant: Distran AG, Zurich (CH)

(72) Inventors: Florian Perrodin, Zurich (CH); Joel Busset, Zurich (CH)

(73) Assignee: DISTRAN AG, Zurich (CH)

( * ) Notice: Subject to any disclaimer, the term of this patent is extended or adjusted under 35 U.S.C. 154(b) by 254 days.

(21) Appl. No.: 17/903,241

(22) Filed: Sep. 6, 2022

(65) Prior Publication Data

US 2023/0071544 A1   Mar. 9, 2023

(30) Foreign Application Priority Data

Sep. 5, 2021   (EP) .................................... 21194947

(51) Int. Cl.
   *G08B 21/18*   (2006.01)
   *G01M 3/24*   (2006.01)
   (Continued)

(52) U.S. Cl.
   CPC ............... *G01M 3/24* (2013.01); *G08B 21/12* (2013.01); *G08B 21/182* (2013.01); *H04N 5/272* (2013.01);
   (Continued)

(58) Field of Classification Search
   CPC ........ G01M 3/24; G01M 3/243; G08B 21/12; G08B 21/182; H04N 5/272; H04N 7/181;
   (Continued)

(56) References Cited

U.S. PATENT DOCUMENTS 3,895,340 A * 7/1975 Gilmour ............. G01S 15/8902
                                                        367/113
5,417,113 A * 5/1995 Hartley ................... G01M 3/24
                                                        381/313
(Continued)

FOREIGN PATENT DOCUMENTS

EP   1371962 A1   12/2003
EP   3531090 A1   8/2019
(Continued)

OTHER PUBLICATIONS

European Search Report from corresponding European Application No. EP 21194947.4, Mar. 2, 2022.
(Continued)

*Primary Examiner* — David J Bolduc
(74) *Attorney, Agent, or Firm* — Workman Nydegger

(57) ABSTRACT

A system includes: an acoustic detection device comprising a plurality of microphones; an output or communication means for sending a signal or a message; a memory for storing a location of at least one region of interest and an associated threshold value; a processing circuit for detecting a location and a sound pressure level of a potential sound source; and for testing if the detected sound source is situated in a Region of Interest, and for testing if the detected Sound Pressure Level is higher than the threshold, and if an outcome of these tests is true, sending a signal or a message for operating a component, such as an audio-visual component or a valve or the like. An acoustic detection device includes Regions of Interest support.

18 Claims, 13 Drawing Sheets

ROI1: Location (see picture above), T1=70dB,
ROI2: Location (see picture above), T2=65dB,
ROI3: Location (see picture above), T3=65dB,
ROI4: Location (see picture above), T4=60dB,
ROI5: Location (see picture above), T5=80dB,

(51) Int. Cl.
  *G08B 21/12* (2006.01)
  *H04N 5/272* (2006.01)
  *H04N 7/18* (2006.01)
  *H04R 1/40* (2006.01)
  *H04R 3/00* (2006.01)

(52) U.S. Cl.
  CPC .............. *H04N 7/181* (2013.01); *H04R 1/406* (2013.01); *H04R 3/005* (2013.01)

(58) Field of Classification Search
  CPC ........... H04R 1/406; H04R 3/005; F17D 5/02; G01H 17/00; G06Q 50/10; G06T 7/11
  See application file for complete search history.

(56) References Cited

U.S. PATENT DOCUMENTS

| | | | |
|---|---|---|---|
| 8,498,836 | B2 | 7/2013 | Carlson |
| 8,638,362 | B1* | 1/2014 | Thompson .............. G01S 15/89 348/81 |
| 2005/0024215 | A1 | 2/2005 | Roy |
| 2006/0098534 | A1* | 5/2006 | Hickling .............. G01S 3/8006 73/594 |
| 2009/0060246 | A1* | 3/2009 | Baliga .................. H04R 19/005 381/354 |
| 2011/0120209 | A1* | 5/2011 | Rose ...................... G01H 11/08 73/40.5 A |
| 2012/0008797 | A1* | 1/2012 | Banba ................... H04R 3/007 381/97 |
| 2014/0000347 | A1* | 1/2014 | Huseynov ............... G01M 3/24 73/40.5 A |
| 2014/0241548 | A1* | 8/2014 | Kim ....................... H04R 3/005 381/91 |
| 2016/0084729 | A1* | 3/2016 | Huseynov ............... G01M 3/24 73/40.5 A |
| 2017/0089800 | A1 | 3/2017 | Huseynov et al. |
| 2017/0251300 | A1* | 8/2017 | Kanamori ........... G10L 21/0208 |
| 2017/0268954 | A1 | 9/2017 | Ocalan |
| 2017/0311080 | A1* | 10/2017 | Kolb ...................... H04N 23/90 |
| 2019/0128739 | A1 | 5/2019 | Stuart |
| 2019/0271441 | A1 | 9/2019 | Zhang et al. |
| 2019/0271610 | A1* | 9/2019 | Perrodin ................ H04R 19/02 |
| 2020/0182735 | A1* | 6/2020 | Perrodin ................ G01H 3/005 |
| 2022/0341772 | A1* | 10/2022 | Takasu .................... G10L 25/21 |
| 2022/0343887 | A1* | 10/2022 | Xiao ................ G10K 11/17823 |

FOREIGN PATENT DOCUMENTS

| | | |
|---|---|---|
| WO | 2018055232 A1 | 3/2018 |
| WO | 2018087622 A1 | 5/2018 |
| WO | 2019166450 A1 | 9/2019 |

OTHER PUBLICATIONS

European Office Action from Corresponding European Patent Application No. EP21194947.4, Dec. 5, 2024.

Omega Engineering, Inc, "OSXL-101 Compact Thermal Image Sensor Application Software", as early as Jan. 1, 2009, 49 pages, software user manual retrieved from <https://assets.omega.com/manuals/M4819.pdf>.

Communication Pursuant to Rule 114(2) EPC from European Patent Application No. EP21194947.4, Mar. 20, 2025.

* cited by examiner

ROI1: Location (see picture above), T1=70dB,
ROI2: Location (see picture above), T2=65dB,
ROI3: Location (see picture above), T3=65dB,
ROI4: Location (see picture above), T4=60dB,
ROI5: Location (see picture above), T5=80dB,

ACOUSTIC DETECTION DEVICE AND SYSTEM WITH REGIONS OF INTEREST

FIELD OF THE INVENTION

The present invention relates in general to the field of acoustic detection devices (also referred to as "acoustic cameras"), and systems comprising an acoustic detection device, e.g. a plant monitoring system, a surveillance system, a gas leak detection system.

BACKGROUND OF THE INVENTION

Acoustic detection devices comprising a plurality of microphones, e.g. MEMS microphones, are known in the art, for example from WO2018087622(A1), WO2019166450(A1), or WO2018055232(A1), all of which are incorporated herein by reference. Known cameras are capable of detecting the presence, the location, and the sound pressure level (SPL) of one or more sound sources relative to a MEMs array. The sound source(s) may e.g. be related to a gas leak, or to mechanical friction (e.g. generated by bearings of a motor). The detection may for example be based on "beamforming", or on an algorithm that assesses the likelihood of the presence of a potential sound source at predefined positions or orientations.

Existing systems using such an acoustic camera, may show information about detected sound sources on a display, for allowing a user to take appropriate action (e.g. closing a valve, sounding an alarm, etc.) in case of an event, e.g. in case of a gas leakage generating a sound emission with a sound pressure level (SPL) above a predefined threshold. This is not ideal for several reasons, such as e.g. (i) the user response may be (too) slow, causing a dangerous situation, (ii) the user interpretation of the situation may be incorrect, etc.

It may be desirable, at least in some circumstances, if the system could take appropriate action automatically, without human intervention. In practice, however, that is easier said than done, and it is a challenge to build a reliable system.

SUMMARY OF THE INVENTION

It is an object of embodiments of the present invention to provide an acoustic detection device, and/or a detection system using an acoustic detection device, with features that allow a more reliable and/or a more relevant detection, e.g. of a gas leak.

It is an object of embodiments of the present invention to provide an acoustic detection device, and/or a detection system using an acoustic detection device, with features that reduce the risk of "false positives" (e.g. reduce the risk of generating an alarm in case a train passes, or in case an aeroplane flies over the scene, or in case a person or an animal makes a sound in the scene).

It is an object of embodiments of the present invention to provide an acoustic detection device, and/or a detection system using an acoustic detection device, capable of detecting certain events (such as for example: detection of a gas leakage, or detection of friction of a motor bearing), and capable of automatically rejecting other events, e.g. events unrelated to the purpose of the system, such as for example passage of a train, or a fly-over of an aeroplane.

It is an object of embodiments of the present invention to provide such a detection device and/or such a detection system capable of rejecting certain events in a relatively simple manner.

It is an object of embodiments of the present invention to provide such a detection device and/or such a detection system, having features that allow the device and/or system to be optimized or customized to a specific environment and/or a specific scene, e.g. to a specific plant or production facility or landscape, e.g. having a particular layout and/or a particular combination of machinery and/or tubes and/or pipes.

It is an object of particular embodiments of the present invention to provide an "ultrasonic gas leakage detection device", and/or a "gas leakage detection system" allowing a more reliable detection and/or allowing to reduce the number of false positives.

It is an object of embodiments of the present invention to provide an "ultrasonic gas leakage detection device", and/or a "gas leakage detection system" capable of taking automatic action in response to a detected gas leak, e.g. in the form of sounding an alarm, closing or opening a valve, activating or deactivating an actuator, etc.

It is also an object of embodiments of the present invention to provide a monitoring system or surveillance system for a production facility comprising an acoustic camera.

These and other objectives are accomplished by embodiments of the present invention.

According to a first aspect, the present invention provides an acoustic detection device comprising: a plurality of microphones (e.g. at least 5 and at most 250 MEMs microphones, or at least 10 and at most 150 microphones, or at least 15 and at most 64 microphones, mounted on a planar or curved surface) spaced apart in at least two directions, and configured for converting acoustic waves originating from a scene into a plurality of analog or digital sound signals; an output (e.g. an output port, a connector) for sending a signal (e.g. an activation signal or a deactivation signal or a drive signal) to an external component, and/or a communication means for sending a message to an external processor; a memory (e.g. RAM or FLASH) for storing information of at least one region of interest said information including location information and at least one threshold level (e.g. a threshold in the form of a Sound Pressure Level, or in the form of a normalized Sound Pressure Level, or in the form of a gas leakage rate); a processing circuit connected to said microphones, to said output and/or to said communications means, and to said memory, and configured for: a) receiving the plurality of sound signals, and detecting a location and a sound pressure level (SPL) or a value derived therefrom (e.g. a corresponding gas leakage rate) of one or more potential sound sources in said scene; and b) for at least one detected sound source, testing if the detected sound source is situated in a Region Of Interest (ROI); and testing if the detected Sound Pressure Level or the value derived therefrom (e.g. a corresponding gas leakage rate) is higher than the at least one threshold associated with that region; and if both conditions are satisfied, sending a first signal and/or a first message indicative of an alarm (e.g. directly or indirectly causing the generation of an audio-visual signal and/or the activation of a valve or an actuator or a motor or a sprayer or a siren).

The plurality of microphones may be arranged on a two-dimensional surface or on a three-dimensional surface, and they are not located on a single virtual line, i.e. they are not collinear. The surface may be planar (i.e. flat) or curved (e.g. hemi-spherical).

If one or both conditions are not satisfied, the method may either discard the sound source or send a second message different from the first message, e.g. a message with status information or logging information or the like.

One of the biggest advantages of this invention is that it allows to define multiple threshold levels depending on the location of the sound source in the scene, as opposed to a single threshold level which is applicable for the entire field-of-view. In this way, the camera can react more accurately and/or in a more suitable manner to a particular (known) scene. As an example, only, in this way acoustic energy originating from a known or expected sound source, e.g. a train following a known trajectory, or one or more trajectories in the scene, can be prevented from generating a false alarm.

It is noted that this approach does not require the sound waveform to be analysed and/or to be categorized using a neural network or the like, although that is not excluded. Instead, the (fixed) scene only needs to be partitioned in a plurality of at least two zones, which may be implemented for example by means of one contour. (in general, in order to define N zones, it is possible to define N-1 contours; alternatively, a bitmap containing N different color-codes may be used). In the example of FIG. 1 five contours are indicated, defining five zones or six zones: a first zone (relatively nearby) comprising a motor or a compressor; a second zone (e.g. containing upright cooling pipes), a third zone (e.g. containing a gas storage tank), a fourth zone (e.g. distal location outside the region of interest), a fifth zone (e.g. comprising a nearby pipe), and implicitly the remaining zone (e.g. containing various tubing).

It is an advantage that regions can be defined by simply Indicating (e.g. drawing) contours on a picture of the scene, e.g. by manual drawing them using a local touch-screen, or by indicating a plurality of points to be interconnected by a polygon, or by indicating tiles of a grid, e.g. using an input device such as a mouse or a stylus, or using a remote computer, or in any other suitable way.

The at least one ROI (region of interest) may be smaller than the "acoustical field of view" of the acoustic camera.

The acoustic detection device may be an ultrasound camera.

The plurality of microphones may be located in a plane, e.g. on a planar PCB.

In an embodiment, the plurality of microphones are arranged on at least two non-parallel planes.

The microphones may be MEMs microphones.

The communication means may comprise a bidirectional transceiver.

It is an advantage when the communication means allows bidirectional communication, because this allows the acoustic detection device to send and receive messages to and from another computing device. The "another computing device" may comprise a smart phone, a tablet, a laptop computer, a desktop computer, a remote server, etc.

The memory may be or may comprise a non-volatile memory (e.g. Flash). This offers the advantage that the acoustic camera can start autonomously.

The at least one Region of Interest may be a 2D region of interest, or a 3D region on interest. In the latter case the information of the at least one ROI further comprises at least one distance (e.g. average distance), or two distances (e.g. a minimum distance and a maximum distance) between the microphones and said region of interest.

In an embodiment, the memory is adapted for storing information of at least two non-overlapping regions of interest (ROI1, ROI2), each may be smaller than the "field of view" of the acoustic camera or "the scene", said information including location information and at least one threshold level for each of the Regions of Interest.

In an embodiment, the information of particular regions of interest may include at least two or at least three threshold values, e.g. related to different messages to be sent, corresponding to different actions to be taken (at system level) dependent on the severity of a leakage.

In an embodiment, there are at least two Regions of Interest, namely a first ROI associated with a first threshold level T1, and a second ROI associated with a second threshold level T2 different from the first threshold level T1.

In an embodiment, the acoustic camera has a microphone array comprising a number of MEMs microphones in the range from 5 to 250, or in the range from 10 to 150, or in the range from 15 to 64.

In an embodiment, step a) further comprises storing a fragment of the sound wave; and step b) further comprises: analysing said fragment, and determining a likelihood (or probability) that said fragment is of a predefined type (e.g. a gas leak, or a mechanical wear, or an electrical discharge), and sending (712) said first signal and/or a first message indicative of an alarm only if all of the following conditions are satisfied: (i) the detected sound source is situated in a Region Of Interest, and (ii) the detected Sound Pressure Level (SPL) or the value derived therefrom is higher than the at least one threshold (T1) associated with that region, and (iii) the likelihood (or probability) of said fragment being of the predefined type is at a predefined probability, e.g. at least 30% or at least 40% or at least 50%.

Determining said likelihood or probability may for example be performed by an artificial intelligence algorithm that is specifically trained for classifying the audio fragment as being caused by one or more of the following: mechanical wear, a gas leak, electrical discharge.

In an embodiment, the acoustic detection device further comprises at least one optical camera configured for capturing at least one image of at least a portion of said scene; the acoustic detection device is further configured for transmitting at least one captured image, optionally after overlaying the captured image with additional information (e.g. textual information).

The optical camera may be embedded in the acoustic sensor device.

Preferably, the portion of the screen comprises at least one ROI (Region of Interest).

While it is possible to transmit the at least one image in an analogue form (e.g. as a CVBS or PAL or CCTV signal), the at least one captured image is preferably digitised and compressed before transmission, e.g. using JPEG or MJPEG or MPEG1 or MPEG2 or MPEG4 format, or another suitable format. The at least one captured image may also be stored in the non-volatile memory (if present). The captured image may be transmitted repeatedly, e.g. periodically, e.g. once every minute.

In an embodiment, the acoustic camera does not contain an optical camera, but an optical image of the scene is stored in a non-volatile memory of the acoustic camera during calibration. The optical image may be captured e.g. by a configuration device (e.g. a smartphone, a laptop computer, etc.) and transmitted to the acoustic camera via a wired or wireless link (e.g. Wifi or Bluetooth).

In an embodiment wherein the communication means comprises a transceiver, the at least one image may also be transmitted upon request from an external device, e.g. in response to a request sent by a plant control system.

In an embodiment, the acoustic detection device comprises at least two optical cameras. These optical cameras may be spaced apart along a horizontal axis, or along a vertical axis. It is an advantage of using at least two optical cameras, because this allows to determine a distance between the optical cameras and objects in the scene, based on the captured images, e.g. using known techniques.

In an embodiment, the acoustic detection device may comprise one or more cameras, e.g. selected from the group consisting of: an infrared camera (IR) camera, an ultra-violet (UV) camera, a hyperspectral camera, and an optical camera. In an embodiment, the acoustic detection device comprises at least two different types of cameras selected from this list, e.g. an IR camera and a UV camera.

In an embodiment, the threshold value as part of the information of the Region Of Interest is a sound pressure level measurable by the plurality of microphones.

With "measurable by the plurality of microphones" is meant the sound pressure level at the location near the microphones, thus at a (typically large) distance from the sound source itself.

It is an advantage of this embodiment that "sound normalization" can be avoided, and that the sound attenuation due to increasing distance between the sound source and the microphones is automatically taken into account by means of the partitioning in different regions and the corresponding threshold value.

In this embodiment, the "threshold value" is typically chosen smaller for ROI further away from the microphones and is typically chosen larger for regions closer to the microphones.

It is noted that this embodiment may be particularly suitable if the distance range (shortest and furthest) between the microphones and the objects in the scene is relatively small for each region, e.g. if a region contains a pipe which extends substantially parallel to the microphones, or contains a relatively compact object (e.g. a compressor) located at a minimum distance.

In an embodiment, the threshold value as part of the information of the Region Of Interest is a gas leakage rate.

In this embodiment, the "threshold value" may be expressed in [Liters per time unit], e.g. in litres per minute or litres per hour. It is an advantage that this threshold value can be specified (by a user) without taking into account the location of the sound source in the scene, or more in particular, without the user or installer having to take into account the distance between the sound source and the microphones. It is an advantage that this is easier to install or setup and is less prone to human errors.

In practice, the acoustic camera may, in step ii), convert the detected sound pressure level into an "estimated gas leakage rate", taking into account a distance between the sound source and the microphones, and may compare this "estimated gas leakage rate" with "the threshold value".

In an embodiment, the acoustic detection device is further adapted for estimating a minimum detectable sound level for the at least one region of interest; and step a) further comprises: testing if the detected sound pressure level is larger than the minimum detectable sound level, and to continue with step ii) only if an outcome of this test is true.

With "minimum detectable sound level" is meant a "sensitivity", or a "minimum detectable gas leakage" of a localized sound source that can be recognized. This value is different from the absolute sensitivity of the microphones.

The "minimum detectable sound level" of a certain region may depend on the presence and the sound pressure level of sound sources in an adjacent region, and/or the presence of a non-localized sound source (e.g. wind or rain), e.g. as described in more detail in WO2019166450(A1), incorporated herein by reference in its entirety. It is an advantage of this embodiment that in this way, the number of false positives ("false alarms") can be further reduced.

The step of "estimating a minimum detectable sound level" may mean "estimating a minimum sound pressure level of a coherent sound source".

In an embodiment, the estimated minimum detectable sound level for at least one of the ROI (e.g. for all ROI) is transmitted via the communication means, and/or is shown on a local or a remote display.

In an embodiment, the estimated "minimum detectable sound level" is transmitted repeatedly, e.g. periodically.

In an embodiment, the acoustic detection device further comprises a display and input means; and the processing circuit is further configured for providing an image (e.g. an acoustic image and/or a captured optical image and/or graphical overlay) on said display, and for allowing an operator to define a location of at least one region of interest, and to specify at least one threshold using said input means.

The display may comprise a built-in LCD display.

The display may be a touch-screen display, in which case the "input means" are integrated in the touch-screen display. Alternatively, or additionally, the input means may comprise one or more keys, a mouse, a stylus, a touchpad, etc.

In this embodiment, the acoustic detection device typically comprises a software module for allowing a user to draw a contour on the display, and to set at least one threshold-level, e.g. using one or more buttons, or a keyboard or an emulated keyboard, or an emulated slider, or the like. The contour may also be defined in a different manner, e.g. by interconnecting a number of points indicated by a user, by means of line segments. The processing circuit may comprise a graphical software module for adding and/or drawing and/or modifying and/or moving and/or deleting such points or line segments.

It is an advantage of this embodiment that this acoustic camera can be configured without requiring a connection to an external processor.

According to a second aspect, the present invention also provides a system, comprising: an acoustic detection device according to the first aspect, fixedly mounted to observe a scene to be monitored; and a display and input means external to but communicatively connected (e.g. by means of a cable, e.g. an Ethernet cable, or wireless, e.g. using a WiFi connection) to the acoustic detection device; and wherein the processing circuit is further configured for providing an image (e.g. an acoustic image and/or a captured optical image and/or graphical overlay) on said display, and for allowing an operator to define a location of at least one region of interest, and to specify at least one threshold using said input means.

The display may be a touch-screen display, in which case the "input means" are integrated in the touch-screen display. Alternatively, or additionally, the input means may comprise one or more keys, a mouse, a stylus, a touchpad, etc.

It is an advantage of this embodiment that the "user interface" can be operated at a distance (e.g. of up to 25 m, or up to 10 m) from the acoustic camera. As an example, the acoustic camera may be fixedly mounted to a pole or a mast at a height of e.g. 10 m, but an operator can configure the acoustic detection device remotely, while standing on the ground.

In an embodiment, the system may furthermore implement an "internal failure detection method" as described in WO2018/087622(A1), incorporated herein by reference in its entirety.

In an embodiment, the system further comprises at least one component operatively connected to the output of the acoustic detection device and configured for receiving and being activated or deactivated in response to the first signal; and wherein the component is selected from the group consisting of: an audio-visual component, a speaker, a siren, a light emitting device, an actuator, a motor, a valve, a relay.

An example of such a system is shown in FIG. 5A.

According to a third aspect, the present invention also provides a system comprising: an acoustic detection device according to the first aspect, fixedly mounted to observe a scene; at least one component selected from the group consisting of: an audio-visual component, a speaker, a siren, a light emitting device, an actuator, a motor, a valve, a relay; a system controller communicatively connected (directly or indirectly) to the acoustic detection device, and operatively connected to said at least one component, and configured for receiving the first and/or the second message sent from the acoustic detection device or a message derived therefrom, and configured for selectively activating or deactivating the at least one component in response to the receipt of said message.

The system may be an acoustic detection system.

The system may be part of a surveillance system, or part of a plant control system.

Stated in simple words, in this embodiment, the acoustic detection device processes the audio signals in order to detect the presence of one or more sound sources in the scene. And if a sound source is found, the acoustic camera tests whether the sound source is located in a region of interest (ROI), and test if the sound pressure level satisfies certain criteria (e.g. is higher then a minimum detectable sound level and/or higher than a threshold), and conditionally sends a first signal (e.g. signal indicative of an alarm) or a second signal (e.g. indicative of "no leakage detection") to the system controller. The system controller receives this message from the acoustic detection device, and may activate or deactivate at least one component in response to the receipt of this message, for example via a PLC. The system controller may take into account further information from the acoustic detector and/or further information from other detectors.

In an embodiment, the system may further comprise a display and input means communicatively connected (e.g. by means of a cable, e.g. an Ethernet cable, or wireless, e.g. using a WiFi connection) to the system controller; and wherein the system controller is further configured for sending an image (e.g. an acoustic image and/or a captured optical image and/or graphical overlay) to said display, and for allowing an operator to define a location of at least one region of interest, and to specify at least one threshold using said input means; and wherein the system controller is further configured for sending this location information and the threshold to the acoustic detection device.

Stated in simple words, in this embodiment, the user or operator can configure the location and threshold of the Region(s) of Interest via a user-interface connected to the system controller.

After configuration, the display may also be used to show captured images of the scene, and/or status information, etc.

According to a fourth aspect, the present invention also provides a system, comprising:

an acoustic detection device fixedly mounted to observe a scene, the acoustic detection device comprising: a plurality of microphones spaced apart in at least two directions, and configured for converting acoustic waves originating from the scene into a plurality of analog or digital sound signals; communication means for sending a message to a system controller; a processing circuit configured for: a) receiving the plurality of sound signals, and detecting a location and a sound pressure level (SPL) or a value derived therefrom (e.g. a corresponding gas leakage rate) of one or more potential sound sources in said scene; and b) for at least one detected sound source, testing if the detected Sound Pressure Level (SPL) or the value derived therefrom (e.g. a corresponding gas leakage rate) is higher than a predefined threshold; and if an outcome of this test is true, sending a message containing the location and the detected Sound Pressure level or the value derived therefrom to the system controller;

at least one component selected from the group consisting of: an audio-visual component, a speaker, a siren, a light emitting device, an actuator, a motor, a valve, a relay; a system controller operatively connected to said at least one component, and communicatively connected (directly or indirectly) to the acoustic detection device; wherein the system controller further comprises storage means or a memory (e.g. a non-volatile memory) storing information of at least one (or at least two) region(s) of interest (e.g. smaller than the scene), said information including location information and at least one threshold level associated with that region (e.g. an alarm threshold in the form of a Sound Pressure Level, or in the form of a normalized Sound Pressure Level, or in the form of a gas leakage rate); wherein the system controller is further configured for: x) receiving the message sent by the acoustic detection device, and extracting the location of the at least one sound source, and the detected Sound Pressure Level or the value derived therefrom; y) testing if the detected location is situated in a Region Of Interest, and testing if the detected Sound Pressure Level or the value derived therefrom (e.g. a corresponding gas leakage rate) is higher than the at least one threshold associated with that region, and if both conditions are satisfied, selectively activating or deactivating the at least one component.

The location information and the associated threshold may be hardcoded in a program executed by the system controller, or it may be stored in a non-volatile memory, and read after power up of the system controller, or it may be retrieved from a website or storage space in the cloud.

In an embodiment, the acoustic detection device further comprises: at least one optical camera configured for capturing at least one image of at least a portion of said scene; and the acoustic detection device is further configured for transmitting at least one captured image, optionally after overlaying the captured image with additional information (e.g. textual information); and the system comprises at least one display connected to or connectable to the system controller; and the system is further configured for showing the at least one captured image, optionally overlaid with additional information, on said display.

In an embodiment, the image sent by the acoustic detection device is overlaid with additional information such as for example one or more visual representations of the regions, and/or indications of the locations of potential sound sources, indications of the energy level or signal strength or leakage rate of gas leakages, etc.

In an embodiment, the image sent by the acoustic detection device, is not overlaid with additional graphical information. As an example, the image sent by the acoustic detection device may be a mere digitised and compressed version of the image captured by the optical camera. Of course it is also possible to send a sub-image, e.g. a portion of the scene containing the detected source.

In both cases, the image sent by the acoustic detection device may be further processed, e.g. scaled, sharpened, etc., and optionally overlaid by the system controller.

In an embodiment, the system further comprises input means (e.g. a touch screen display, an input connector for connecting a mouse or trackball, a touchpad, etc.) connected or connectable to the system controller; and the system controller is further configured for allowing a user to define a location of the at least one region of interest, and to specify the at least one associated threshold using said input means.

Preferably the system controller further comprises a non-volatile memory (e.g. Flash or a hard disk or the like), and the system controller is configured for storing the location information and the associated threshold in said non-volatile memory.

In an embodiment, the acoustic detection device is further adapted for estimating a minimum detectable sound level for the at least one region of interest, and for optionally transmitting this minimum detectable sound level to the system controller; and the acoustic detection device is further configured for testing if the detected sound pressure level is larger than the minimum detectable sound level and for sending the message depending on an outcome of the test; and/or wherein the system controller is further configured for testing if the detected sound pressure level is larger than the minimum detectable sound level, and for activating or deactivating said component depending on the outcome of the test.

In an embodiment, the acoustic detection device may further comprise an accelerometer and/or a gyroscope and/or a magnetometer configured to monitor an absolute or relative position of the acoustic camera with respect to its initial position and/or orientation. In case movement or rotation is detected, an alarm may be generated, or the region of interest might be adjusted accordingly such that the region of interest corresponds with the correct physical location. This may be particularly useful in case the camera is rotatable, or is inadvertently shifted due to wind, or the like.

In an embodiment, the threshold value is a gas leakage rate, and the acoustic detection device or the system controller further comprises distance information for the at least one region of interest, and the acoustic detection device or the system controller is further configured for converting the detected sound pressure level into an estimated gas leakage rate; and the acoustic detection device or the system controller is further configured for displaying the detected gas leakage rate on the display.

Such an audio detection device is in fact an "ultrasonic gas leakage detection device", and such a monitoring system is in fact a gas leakage detection system.

The conversion of the sound pressure level into a gas leakage rate may be performed in known manners, e.g. in the same way as described in WO2019166450(A1).

According to a fifth aspect, the present invention also provides a method of detecting an acoustic sound source in a scene, comprising at least the steps shown in the flow-chart of FIG. 7 in boxes having a solid line, i.e. steps 702, 704, 710 and 712.

These and other aspects of the invention will be apparent from and elucidated with reference to the embodiment(s) described hereinafter.

Figure 1A:
FIG. 1A shows a grayscale picture of a first illustrative scene to be monitored for gas leaks.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same or similar reference signs refer to the same or similar elements.

DETAILED DESCRIPTION OF ILLUSTRATIVE EMBODIMENTS

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details.

In the present application, the expression "false positive" may refer for example to a situation where a sound source is determined to be a gas leakage, while in reality it is not a gas leakage.

The present invention relates in general to the field of acoustic detection devices, also referred to as "acoustic cameras", and systems comprising an acoustic detection device, e.g. a plant monitoring system, a surveillance system, a gas leak detection system, etc., and more in particular to systems wherein the acoustic camera is fixedly mounted (e.g. to a wall, or to a pole) to observe or monitor a particular scene.

Desiring to build a system that can automatically take action in certain cases without human intervention, the system needs to be able to detect relevant sound sources and/or reject irrelevant sound sources. Whether a sound source is relevant or irrelevant may depend on the particular application in which the acoustic camera is used, e.g. a plant monitoring system, a surveillance system, a gas leak detection system. In the latter case, for example, the acoustic camera is used to detect gas leaks, and should reject all other sounds sources, such as e.g. the sound generated by an air-conditioning system or a combustion engine located on the same premises.

Rejection of "false positives" is of course always desired, but the consequences of a false positive detection are much more severe when the system is configured to automatically take certain actions without human intervention, such as for example automatically opening or closing a valve of a gas pipe, or activating a fire extinguisher, or starting a water pump, activating a siren, etc.

In order to address this problem, the inventors came to the idea of customizing the system to the particular scene, in order to improve the probability of correct detection. More specifically, they came to the idea of taking into account whether or not the detected sound source(s) is/are located inside one or more Regions of Interest (ROI), which are predefined by an operator during an installation or configuration or setup procedure, hence the location(s) of the Region(s) of Interest is/are fixed during actual use of the acoustic detection system. They further realized that the step of "testing whether a sound source is located inside a Region of Interest" may be implemented inside the acoustic camera itself, but that is not absolutely required, and it may also be implemented outside the acoustic camera, e.g. in a system controller. Both solutions are possible, and have their advantages and disadvantages, e.g. in terms of bandwidth required, ease of configuration, etc. Another advantage of using Regions of Interest is that it allows to use different threshold values for different regions.

While not absolutely required for the invention to work, specifying the locations of the Region(s) of Interest is very easy and very practical if the acoustic camera further comprises an optical camera, and if the system is further provided with a display and input means and software routines for allowing the operator or the installer to simply "draw" the Region(s) of Interest on that picture. Of course, other techniques to further reduce the number of false positives may also be used, such as e.g. capturing an audio fragment during a certain time period, and analysing the spectral content of that audio fragment; and/or repeatedly estimating a minimum detectable sound level or lowest sensitivity threshold (also referred to herein as "noise floor" but having a special meaning in this application), and testing whether the sound pressure level (SPL) of the sound transmitted by the sound source is larger than said minimum detectable sound level or lowest sensitivity threshold or "noise floor"; or testing whether the location of the sound source is fixed (versus moving around).

These and other aspects will now be described in more detail with reference to the Figures.

FIG. 1A shows a grayscale picture of a first illustrative scene to be monitored for gas leaks. The acoustic camera is mounted at a fixed location relative to the scene. As can be seen, there are several pressure vessels located in the back of the scene, and various gas pipes mainly in the lower half of the picture. As already mentioned in the background section, existing acoustic cameras are capable of detecting the location of localized sound sources, e.g. a gas leakage in this scene, and are capable of measuring the sound pressure level (SPL) generated by that sound source, and are capable of converting the sound pressure level into a gas leakage rate (e.g. in litres/hour) taking into account the distance between the acoustic camera and the sound source, hence, these aspect need not be explained in further detail here. In existing systems where the acoustic camera further comprises an optical camera, the acoustic camera may provide picture information captured by the optical camera and may overlay that image with textual information and/or with an indication of the location of the sound source.

Figure 1B:
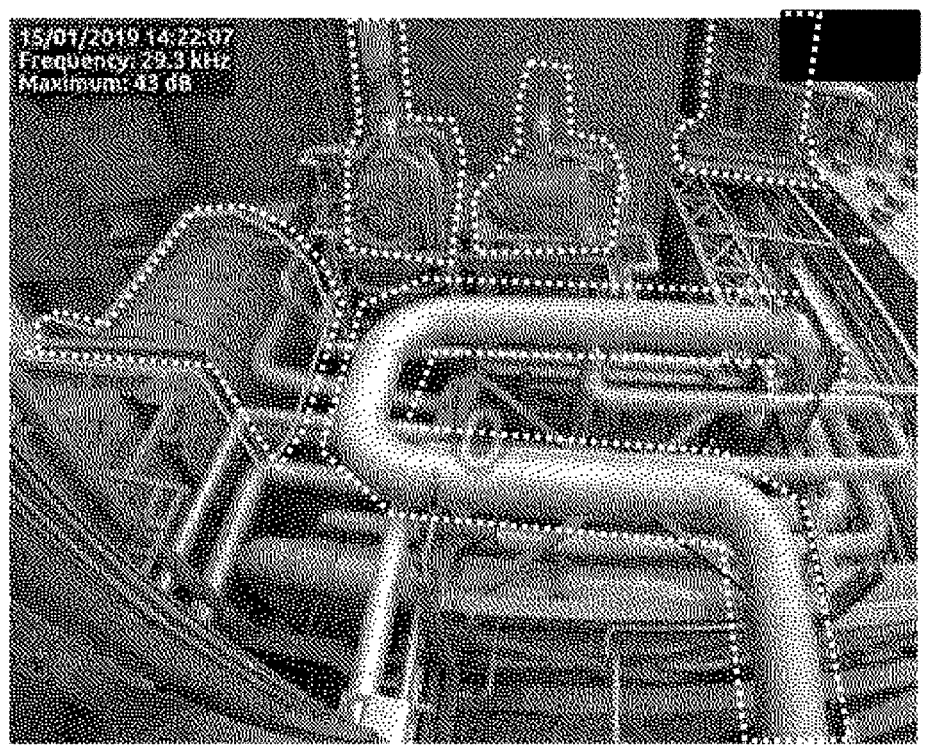
FIG. 1B shows a dithered version of FIG. 1A, overlaid by five ROI (Regions of Interest).

FIG. 1B shows a dithered version of FIG. 1A, overlaid by five illustrative contours corresponding to five Regions of Interest (ROI). It is noted that the picture of FIG. 1A is dithered in FIG. 1B, because the grayscale image of FIG. 1A may not be very well visible after processing by the patent offices, but of course, in practice, the picture sent by the acoustic camera does not have to be dithered.

The main purpose of FIG. 1B is to illustrate that, if the optical image of FIG. 1A is shown to an installer, e.g. on a display embedded in or connected to the acoustic camera, or on a display of a configuration device (e.g. a tablet or laptop computer, or the like) communicatively connected to the acoustic camera, or on a display of a remote computer communicatively connected to the acoustic camera via the internet, a user could easily "draw" these regions using suitable software routines and suitable input means (e.g. a pen, a stylus, a mouse, a touch-screen), or could easily "define" these regions by indicating the positions of the corners of a polygon (e.g. by clicking with the mouse, or clicking on the touch-screen), or the region could be automatically or semi-automatically selected by an object-recognition algorithm wherein the user can select or deselect certain objects, etc.

The skilled reader will understand that it is also possible to "define such regions" in case the acoustic camera does not contain an optical camera, e.g. by taking a picture using a discrete optical camera or a smart phone or the like, and processing the image afterwards, but of course that is less convenient.

Another way to define a region could comprise physically moving a sound source (e.g. a loudspeaker) in the field, and detecting the locations of this sound source by the acoustic camera. These locations may form or be part of a contour. The contour may be stored in memory (e.g. non-volatile memory). The contour may optionally be manually edited, etc.

Either way, the position of the at least one Region of Interest can then be stored in a memory device or a storage device somewhere in the system, e.g. in a memory of the acoustic camera, e.g. a volatile memory (RAM) or a non-volatile memory (NVRAM, FLASH), and/or on a hard disk drive of a laptop computer or a non-volatile memory of a smart phone or a network-drive of a system controller communicatively connected to the acoustic camera.

The positions of the Regions of Interest may be read from the (volatile or non-volatile) memory of the acoustic camera, or may be downloaded to the memory of the acoustic camera at start-up (e.g. at power-on) of the acoustic camera, in embodiments where the acoustic camera is configured to test whether the detected acoustic sound source is situated in one of the Regions of Interest. In embodiments where this test is implemented in the system controller, the acoustic camera itself does not need to know where the Regions of Interest are located.

Figure 1C:
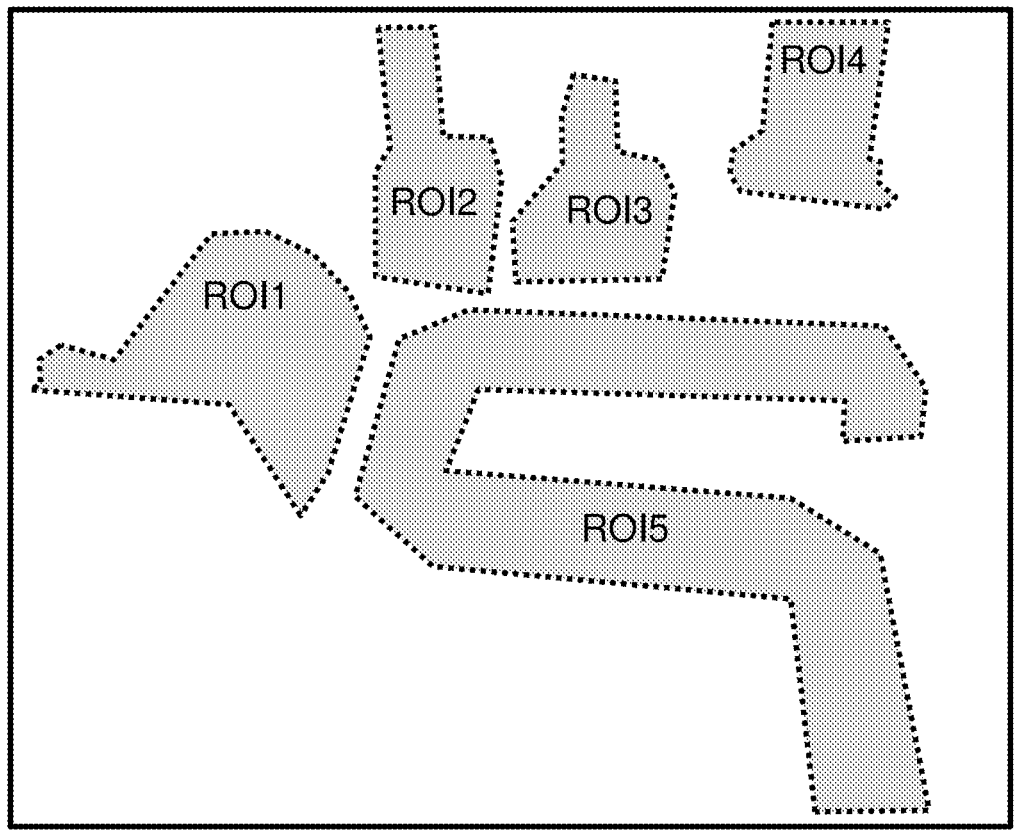
FIG. 1C shows the locations of the five ROI (Regions of Interest) used in FIG. 1B, each with a corresponding threshold level.

FIG. 1C shows the locations of the five ROI (Regions of Interest) used in FIG. 1B without showing the actual picture. The main purpose of this figure is to show examples of potential shapes of the Regions of Interest. As can be seen, preferably the ROI are non-overlapping 2D shapes. The shapes may be convex or concave. The regions are preferably defined using contours. The contours may be formed by straight- or curved-line segments, and/or by interconnecting corners of a polygonal shape, or in any other way.

In the example of FIG. 1B and FIG. 1C, five Regions of Interest are defined, but of course, the present invention is not limited thereto, and embodiments of the present invention may use more than five ROI, or less than five ROI, as long as there is at least one Region of Interest which is smaller than a graphical representation of the scene (e.g. "acoustic picture") which can be captured by the microphone array. In case the acoustic camera also comprises an optical camera, the at least one ROI may be smaller than the "acoustical picture", or smaller than the "optical picture", or smaller than an overlap of the optical picture and the acoustic picture. In case the acoustic camera also comprises an optical camera, the non-overlapping region may also be considered a ROI.

As will be explained in more detail in FIG. 8 and FIG. 10, the acoustic camera may be configured for detecting the location and a sound pressure level of a sound source, and the acoustic camera and/or the system controller may be configured for testing whether the sound source is situated in a region of interest, and may be configured for testing whether the sound pressure level of the sound source is larger than the predefined threshold associated with the Region of Interest in which the sound source is located, and to take appropriate action depending on the outcome of the comparison.

Each ROI is associated with at least one threshold level. In the example of FIG. 1B, ROI1 is associated with a threshold level of 70 dB, ROI2 is associated with a threshold level of 65 dB, etc., but the present invention is not limited thereto, and it is also possible to associate more than one threshold level with a particular region of interest, corresponding to different actions to be taken. For example, in an alternative embodiment, ROI1 may be associated with a first threshold level T1A of 70 dB, which will cause the closing of a valve; and a second threshold level T1B of 60 dB, which will cause the transmission of a warning message to a number of people. In general, each ROI may have one or more than one threshold value, and passage of each threshold value may lead to a different action.

It is of course also possible to associate other data with each Region of Interest, such as for example: a text string describing the particular ROI; a mobile phone number of a person to be contacted in case of an event; an identifier ID of an action to be automatically taken (e.g. "closing a particular valve" or "activating a siren", etc.) in case the (largest) threshold value is superseded; a distance or average distance between the ROI and the acoustic camera, or a corresponding scaling factor by which the measured sound pressure level (SPL) needs to be multiplied for normalizing the sound in order to compensate for the attenuation due to said distance.

In the example of FIG. 1C, the threshold values are expressed in decibels (dB). Depending on the implementation, the measured sound pressure level is to be compared with these threshold levels directly, or the measured sound pressure level first needs to be normalised before comparison with the threshold levels. Or stated in other words, the threshold level associated with the Regions of Interest may or may not take into account the distance between said Region of Interest and the microphone array of the acoustic camera. Alternatively, the threshold values may also be specified in terms of a physical quantity, such as e.g. in terms of a leakage rate, expressed in Litres per time unit (e.g. Litres per second, or Litres per minute, or Litres per hour), for example as described in more detail in WO2019166450 (A1) incorporated herein by reference in its entirety.

In an embodiment, an event is created when a localized sound source is detected, and when the probability or likelihood that this sound source is recognized to be a "gas leak" is higher than a certain threshold. The recognition may be based on spectral analysis or temporal analysis of a sound sequence obtained from the sound source, and/or may be based on an AI-algorithm for categorizing the sound source, and/or may take into account other parameters, such as the position of the sound source. For example, if the position of the sound source moves over time, it is very likely that it is not a gas leakage.

Some embodiments of the present invention use only the comparison with the threshold level but do not use the probability (or likelihood). Other embodiments use the probability (or likelihood) but not the threshold. Yet other embodiments use both the probability (or likelihood) and the threshold.

In an embodiment, where the "optical image" is smaller than the "acoustic image", the part of the acoustic image which falls outside of the visible image may also be regarded as a region of interest per se, having its own threshold, and causing an event.

In some embodiments, the threshold level(s) may be time-dependent threshold levels. For example, in the example of FIG. 1C, the threshold T4 may assume one of two predefined values, e.g. 60 dB from 8:00 AM to 17:00 PM, and 50 dB from 17:00 PM to 8:00 AM. But of course, a more complex time-dependence may also be used, for example the system could learn to recognize a pattern of a sequence of repetitive events such as for example daily routines, or series of a first event lasting for a certain period followed by a second event lasting for a second period, etc.

The time-dependent threshold values may be stored using a look-up table, or using a mathematical formula, for example using a piece-wise linear curve, or in any other suitable way.

Of course, the threshold levels may also take into account the date. For example, the threshold may be lower on Saturday and Sunday, and higher from Monday to Friday.

In some embodiments, the threshold levels may vary dependent on the state of a particular external device or machine, e.g. dependent on the state of a motor or a pump or a compressor or a cooling device. As an example, a first threshold value may be applicable when said device or machine is in an active state (e.g. motor is running), and a second threshold value may be applicable when said device or machine is in a passive state (e.g. motor is not running).

Needless to say, the combined use of Regions of Interest and "dynamic thresholds" (e.g. time dependent or status dependent) allows to reduce the risk of "false positives" even further.

Figure 2A:
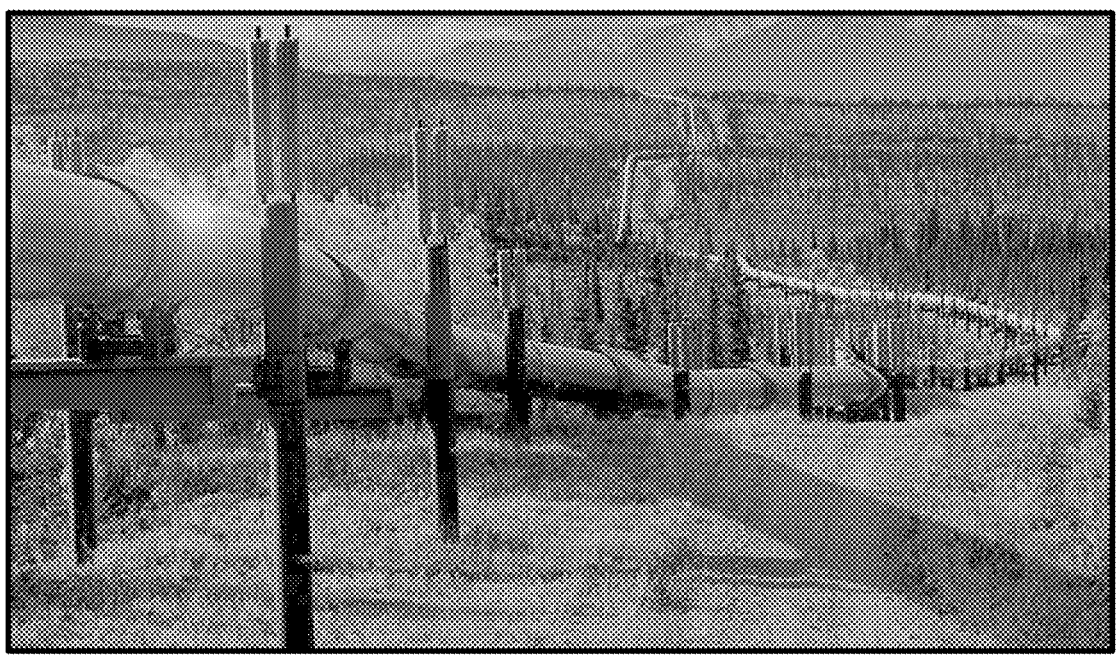
FIG. 2A shows a grayscale picture of a second illustrative scene to be monitored for gas leaks.

FIG. 2A shows a grayscale picture of a second illustrative scene to be monitored for gas leaks. This picture shows a gas pipe extending hundreds of meters away from the acoustic camera.

Figure 2B:
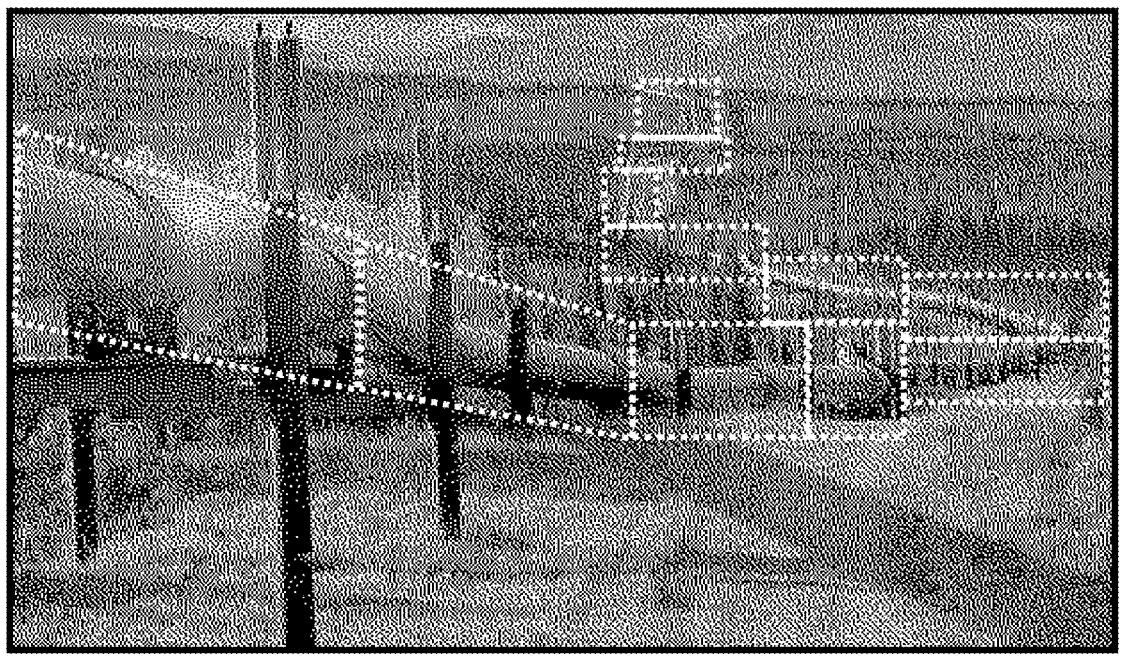
FIG. 2B shows a dithered version of FIG. 2A, overlaid by eleven ROI (Regions of Interest).

FIG. 2B shows a dithered version of FIG. 2A, overlaid by eleven Regions of Interest. In the example, each ROI covers a portion of the pipeline.

Figure 2C:
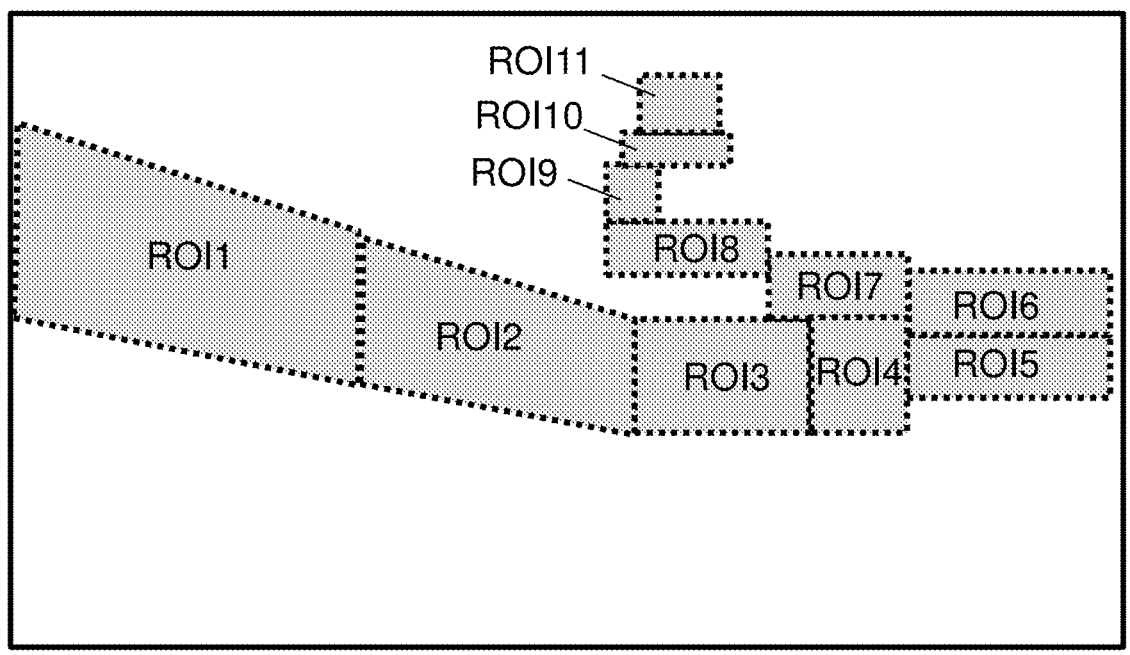
FIG. 2C shows the locations of the eleven ROI (Regions of Interest) of FIG. 2B.

FIG. 2C shows the locations of the eleven Regions of Interest of FIG. 2B. The ROI are non-overlapping 2D regions smaller than the optical picture.

Similar to what was explained above, each ROI is associated with at least one threshold value. The threshold value may be expressed for example in decibels (dB) or in terms of a gas leakage rate. Optionally, some ROI may be associated with more than one threshold value, or with a time-dependent threshold value, or with a state-dependent threshold value. Optionally, some ROI may be further associated with additional information, such as distance information, textual information, a mobile phone number, an action identifier, etc.

As will be explained in more detail in FIG. 8, the acoustic camera may be configured for detecting the location and the sound pressure level (SPL) or a corresponding gas leakage rate of potential sound sources in the scene, and if a sound source is found, to test if this sound source is located in one of the Regions of Interest, and if it does, to test if the sound level is larger than the threshold level associated with that region, and if that is also the case, to automatically take action itself by sending a signal to a component (e.g. to activate a siren, or to open or close a valve, or to start or stop a motor, or to activate or deactivate an actuator, etc.) or to send a message to another processor (e.g. to a system controller of a plant surveillance system) to take appropriate action.

In practice, the test may take into account also other parameters or perform other measurements, such as for example, by taking into account the probability (or likelihood) that the generated sound is a gas leak; and/or by taking into account a minimal detectable sound level; and/or by taking into account the time duration during which the sound level was larger than the threshold level, and/or by analysing a spectral analysis of a sound fragment, and/or taking into account an average wind speed, and/or noise due to rain, etc.

In certain embodiments, the Regions of Interest are 3D regions, for example having a projected area as illustrated in FIG. 2B and FIG. 2C, but furthermore located at a predefined distance range from the acoustic camera, for example each ROI having two additional parameters: a minimum distance and a maximum distance. In such embodiments, the acoustic camera is preferably further configured for determining the distance between the detected sound and the acoustic camera, and for testing if the determined distance is a value inside said predefined range; and for taking the specified action (e.g. closing a valve, sounding an alarm, etc.) only if the projected location is situated in the projected 2D area and if the distance is a value inside said predefined range, meaning that the sound source is located in the 3D region.

It is a major advantage that certain "false alarms" can be avoided by making use of 2D or 3D Regions of Interest, and optionally taking into account further information. For example, if a loud train would pass in the scene, but outside of the Regions of Interest, it would not trigger an event such as a gas leakage. The cost implications of unnecessary shutting down a pipeline may be huge. On the other hand, thanks to the Regions of Interest, the system can ignore irrelevant sources, which may allow to define lower threshold levels for a real problem, e.g. a real gas leak. Needless to say, if the acoustic camera is more sensitive, chances of detecting a real gas leak, or detecting a real gas leak earlier, can be increased, hence dangerous situations may be avoided, and/or costs can be reduced.

Figure 3A:
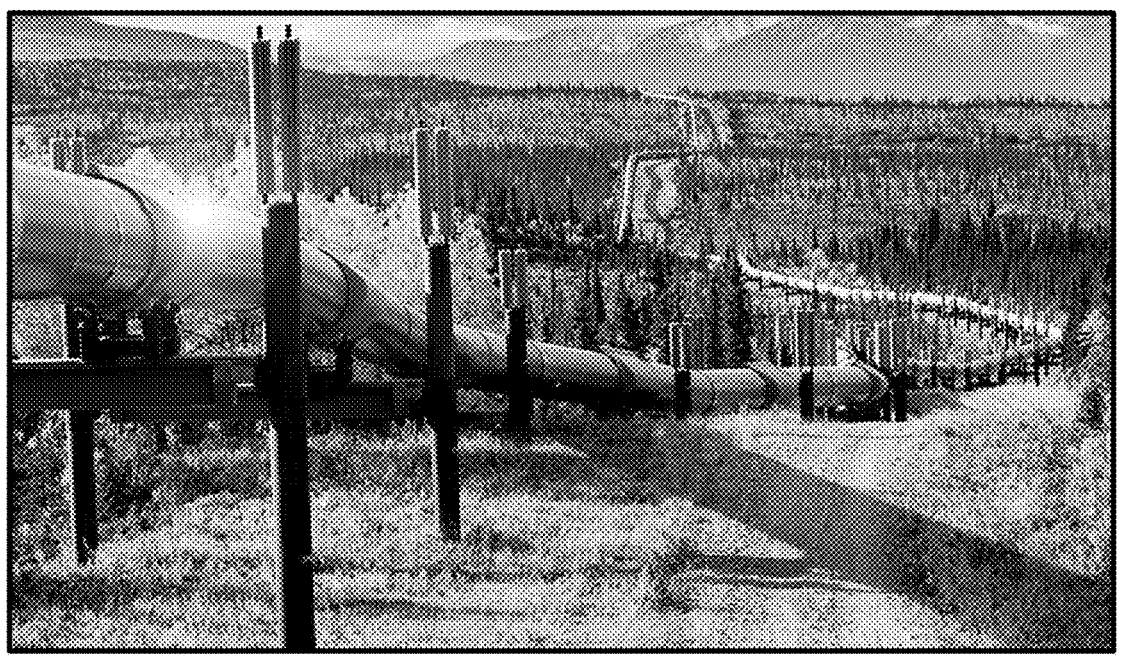
FIG. 3A shows the same scene as FIG. 2A.

FIG. 3A shows the same scene as FIG. 2A.

Figure 3B:
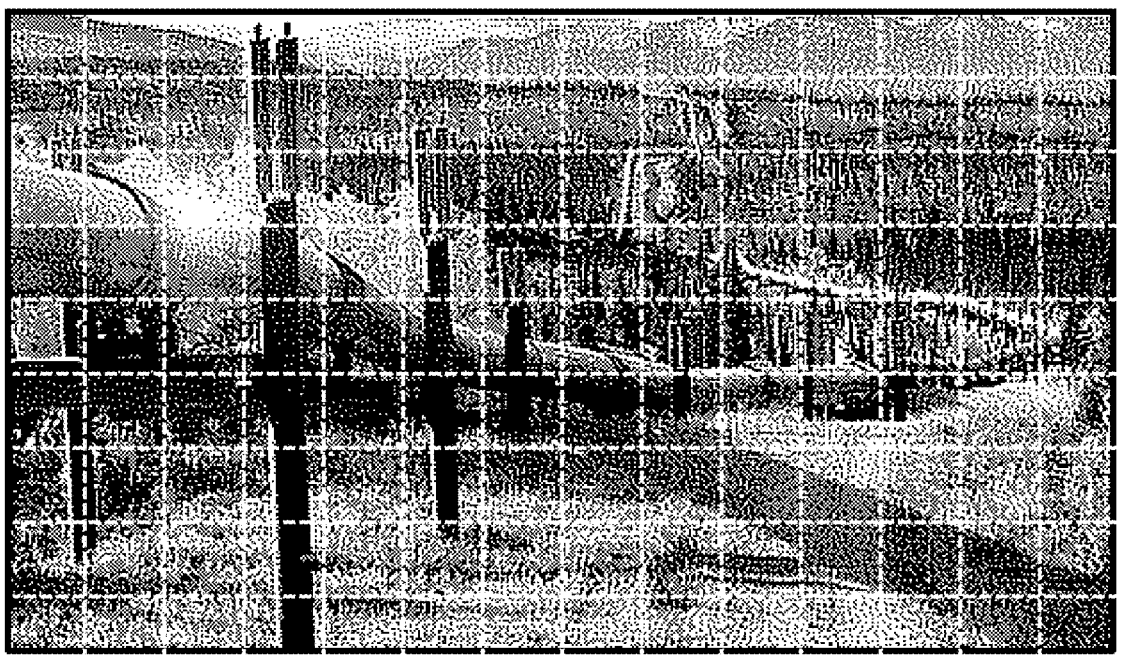
FIG. 3B shows a dithered version of FIG. 3A, overlaid by horizontal lines and vertical lines, forming a two-dimensional grid.

FIG. 3B shows a dithered version of FIG. 3A, overlaid by a plurality of horizontal lines and vertical lines forming a two-dimensional grid. In the specific example shown in FIG. 3B, there are eight (8) horizontal lines defining nine (9) rows, and there are thirteen (13) vertical lines defining fourteen (14) columns, but of course the present invention is not limited thereto, and a grid having more or less than eight rows and/or having more or less than fourteen columns can also be used. The grid partitions the captured image in a plurality of tiles, in the example of FIG. 3B in 9*14=126 tiles. In practice, the horizontal lines may but need not be equidistant, and the same applies for the vertical lines. In fact, it is not absolutely required to use horizontal lines and vertical lines either, but it is convenient.

Figure 3C:
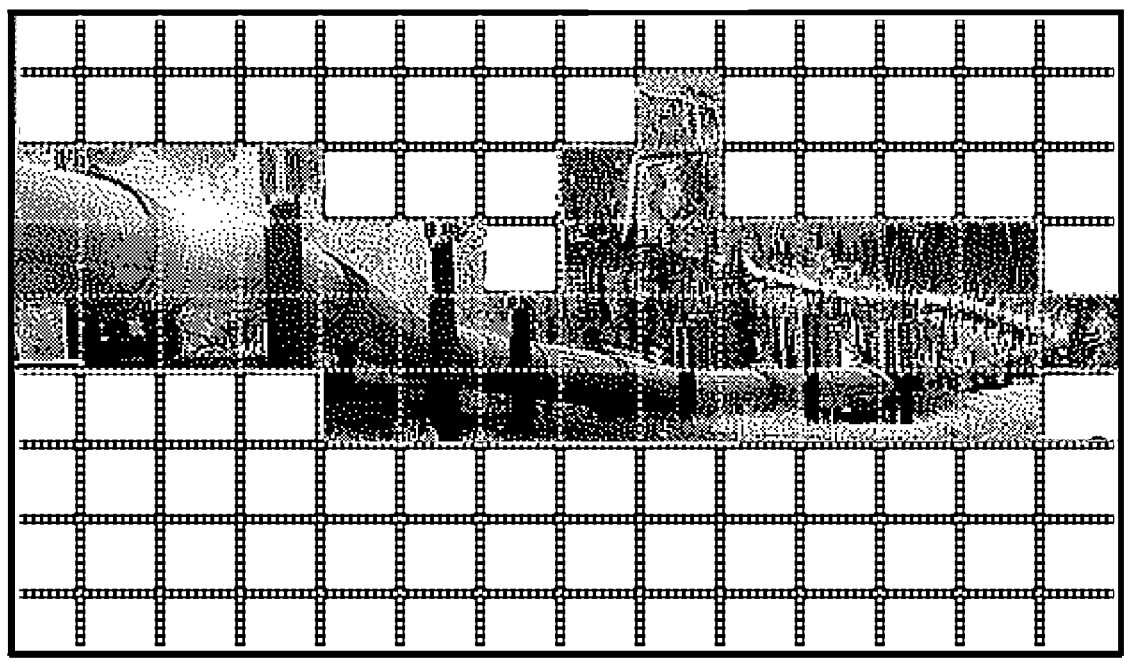
FIG. 3C shows a mosaic formed by a subset of the tiles of FIG. 3B, each tile defining a region of interest.

FIG. 3C shows a mosaic formed by a selection of the tiles of FIG. 3B, wherein each selected tile defines a Region of Interest. Alternatively, several tiles may be combined to form a region of interest. Depending on the implementation of the configuration routines, tiles can e.g. easily be selected or deselected by clicking a tile with a mouse pointer, or by typing combinations of a Letter (for a column) and a number (for a row), or in other suitable ways. Selecting and deselecting tiles may be easier than drawing contours on a display, but the overall goal is the same, namely, to specify the location(s) of one or more Region(s) of Interest, and to associate at least one threshold value and/or likelihood with each Region of Interest, for allowing the acoustic detection system to reject sound sources outside of the one or more Region of Interest. In case multiple regions of interest are indicated, for example one region per tile, the acoustic detection system advantageously may use different parameters for the different regions of interest, for example different threshold values, different distance ranges, etc.

As explained above, the Regions of Interest of FIG. 3B and FIG. 3C may be 2D regions or 3D regions. As also explained above, the threshold values may be fixed values, or time-variant, or dependent on the status or mode-of-operation of a certain device or machine or engine or the like.

It can be understood from the examples above (see FIG. 1C, FIG. 2C and FIG. 3C) that by using at least one, or a plurality of Regions of Interest, which are "customised" to a particular scene, the detection of real "events", for example actual gas leaks, can be improved, and/or the number of "false positives" can be reduced, thus improving the overall reliability (or confidence level or trustworthiness or correctness or accuracy) of the detection system. The improved reliability in turn makes it possible that the system may take certain actions automatically, in response to a detected sound source located at a particular 2D or 3D location and having a sound pressure level larger than a predefined threshold and/or having a likelihood higher than a certain value. As mentioned above, the reliability of the acoustic detection system may be further improved by determining and taking into account a "minimum detectable level of a localized sound source" in that particular scene, also referred to as "detector sensitivity", e.g. as described in more detail in WO2019166450(A1). It is noted that this sensitivity is not a single value applicable for the entire scene but may be different for each Region of Interest. Other ways of further improving the reliability (or confidence level or trustworthiness or correctness or accuracy) are also contemplated, such as for example by taking into account a probability that the detected sound is a gas leakage, which may e.g. be based on an analysis of the frequency spectrum of a sound fragment originating from the sound source.

Figure 4:
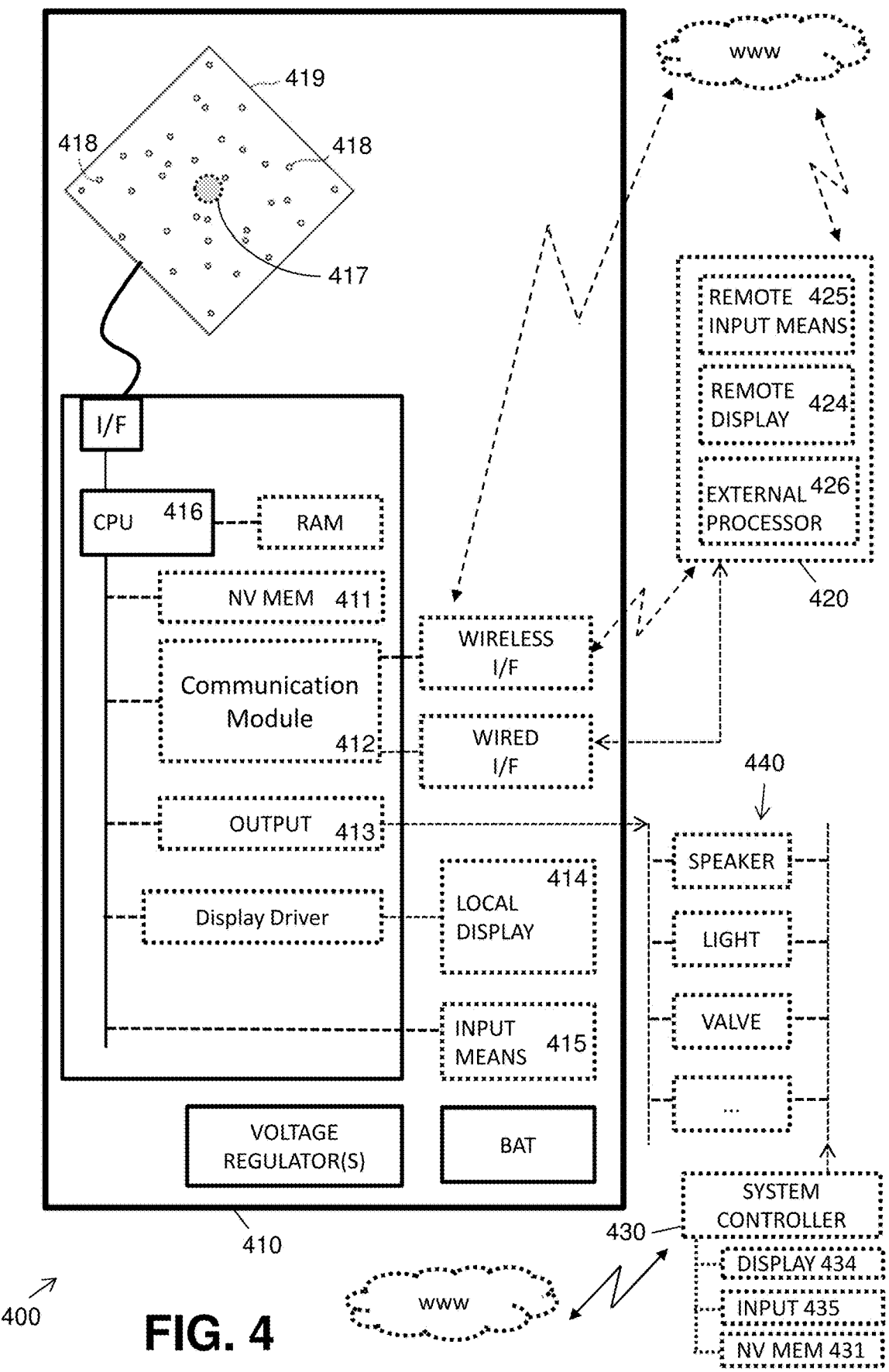
FIG. 4 shows a block-diagram of an illustrative system comprising an acoustic sensor device (or "acoustic camera") having an output connected or connectable to one or more components (e.g. speaker, light, valve, . . . ) and/or having communication means connectable or connected to a second processor (e.g. tablet, laptop, smartphone, iPad, . . . ) external of the acoustic sensor device. The system uses at least one ROI smaller than the scene, or at least two Regions of Interest, to reject irrelevant sound sources, in order to reduce false alarms.

FIG. 4 shows a block-diagram of an illustrative acoustic detection system 400 comprising an acoustic sensor device (or "acoustic camera") 410 having an output 413 connected or connectable to one or more components 440 (e.g. a siren, a speaker, a light, a valve, a motor, an actuator, . . . ) and/or having a communication module 412 connectable or connected to an external computing device 420, e.g. an external configuration device (e.g. tablet, laptop computer, smartphone, . . . ) having a second processor 426, and/or connectable or connected to a system controller 430 (e.g. a controller of a plant surveillance system), directly (e.g. via Wifi) or indirectly (e.g. via the internet).

The acoustic camera 410 comprises a plurality of microphones 418, e.g. a plurality of MEMS microphones. The plurality of microphones may be mounted on a printed circuit board PCB 419, and spaced apart in at least two directions (optionally in 3 directions), or may be mounted on a 3D surface, e.g. having a parabolic shape or a hemispherical shape. The 3D surface may form a cavity or may have a hollow space. The cavity or hollow space may be filled or at least partially filled with a damping material, or an absorption material. The microphones may be located on the outside of the 3D surface or may be located on the inside of the 3D surface. Absorbing material (e.g. a foam) may be applied on the other side of the 3D surface. The microphones 418 are configured for converting acoustic sound waves originating from a scene into a plurality of analog or digital sound signals. In case the microphones are mounted on the outside of the 3D surface, it may be desirable to have multiple optical cameras in order to capture the entire scene observed by the acoustic camera, which may encompass an angular range of 360° around the acoustic camera. The images or video-streams from the various cameras may be sent as a single image (e.g. via a stitching technique) or a single stream, or may be sent in a time-multiplexed manner, or in any other suitable way.

In embodiments of the present invention, the acoustic camera 410 comprises a number of MEMs microphones in the range from 5 to 250, or in the range from 10 to 150, or in the range from 15 to 64.

According to an underlying principle of the present invention, the acoustic detection system 400 uses at least one Region of Interest ROI, smaller than the entire scene, to reject irrelevant sound sources, in order to increase the detection accuracy (or reliability or trustworthiness), by reducing false alarms, as described above.

The information (e.g. location information and at least one threshold value) of the at least one ROI may be defined or configured in several ways, for example (i) using a configuration procedure running on the acoustic camera itself for obtaining input from an operator via input means 415 and a local display 414, or (ii) using a configuration procedure running on an external configuration device 420 for obtaining input from an operator via remote display 424 and remote input means 425, or (iii) using a configuration procedure running on an external computer, e.g. on a system controller 430, for obtaining input from an operator via a remote display 434 and remote input means 435 thereof. The system controller 430 may for example be part of a surveillance system of a production facility.

The display 414, 424, 434 may comprise for example an LCD display, or a touch screen display. The input means 415, 425, 435 may comprise for example a keyboard, a mouse, a pen, a stylus etc. In case of a touch screen display, the display can be used both as display means and as input means. As described above, the location of the at least one region of interest may be defined e.g. by drawing a contour, or showing a grid as overlay on an optical picture of the scene, taken by an optical camera 417, which may optionally be integrated in the acoustic camera 410. If the acoustic camera does not contain an optical camera, an image of the scene may be provided by an external device.

In some embodiments, the acoustic sensor device 410 comprises at least two optical cameras, and the acoustic sensor device 410 is further configured for determining a distance of certain objects in the scene (e.g. of a pipe) based on images obtained from both cameras, e.g. using triangulation techniques.

In some embodiments, the acoustic sensor device 410 further comprises a LiDAR.

Once defined, the information about the at least one Region of Interest may be stored in a memory or storage means of the acoustic camera 410 and/or in a memory or storage means of an external configuration device 420 and/or in a memory or storage means of an external system controller 430.

During actual use, the actual test of whether a detected sound source is situated in a Region of Interest or not, may be performed by the processor 416 inside the acoustic camera 410, or by the processor 426 inside the configuration device 420, or by the system controller 430, or partially by two or more of these controllers, for example partially by the acoustic camera and partially by the system controller 430. The latter may for example be used in case the system controller 430 is connected to multiple acoustic cameras, monitoring multiple scenes, or monitoring a particular scene from multiple angles.

The acoustic camera 410 further comprises an output 413 and/or communication means. The output 413 (e.g. an output port, or an output connector), when present, may be adapted for sending a signal (e.g. an electrical signal such as a current signal or a voltage signal, or an optical signal, an analog signal or a digital signal, a baseband signal or a modulated signal) to an external component 440, e.g. a speaker, a siren, a light device, a valve, a motor, an actuator, etc. The communication means, when present, may be configured for sending a message to an external processor 426, 430. The communication means may comprise a communication module 412 (e.g. a Wifi-module or a Bluetooth module) and/or a wired interface (e.g. comprising an Ethernet connector) and/or a wireless interface (e.g. comprising a Bluetooth antenna or a Wifi antenna or an infrared IR transceiver).

The communication module may be a transmitter, a receiver, or a transceiver.

In certain embodiment, the acoustic camera 410 is configured for sending and/or receiving signals in accordance with the "HART protocol" standard, or in accordance with the "wireless HART protocol" standard. The HART (Highway Addressable Remote Transducer) Protocol is an open standard used to send and receive digital information using analog wiring between devices. But of course, the present invention is not limited hereto, and other protocols can also be used, such as for example, but not limited to Sigfox, LoRa Long Range), LoRaWan, or another IOT (Internet-of-Things) protocol.

The acoustic camera 410 further comprises processing means, e.g. a Digital Signal Processor DSP or a Central Processing Unit CPU, or both.

The acoustic camera may also comprise other components, such as a battery BAT, voltage regulators, a display driver, etc., which are all well known in the art, and hence need not be explained in further detail here. Power may also be provided via the wired interface, e.g. using Power over Ethernet (PoE).

The main purpose of FIG. 4 is to show that the acoustic detection system 400 comprises at least an acoustic detection device 410 (also referred to as "acoustic camera") and at least one component 440 selected from the group consisting of an audio-visual component, a speaker, a siren, a light emitting device, an actuator, a motor, a valve, and a relay. The acoustic camera 410 is configured for detecting one or more sound sources, e.g. caused by gas leaks, and to automatically send a signal and/or a message to activate or deactivate one of said components 440 without human interaction, when predefined conditions are met, comprising at least the condition that the sound source has to be situated in at least one predefined Region Of Interest.

FIG. 4 shows an illustrative block-diagram of an overall acoustic detection system. As can be seen, many parts of the block-diagram of FIG. 4 are shown in dotted line, meaning they are optional. Many implementations using the principles explained above are possible. A few examples will be described in more detail next.

Figure 5A:
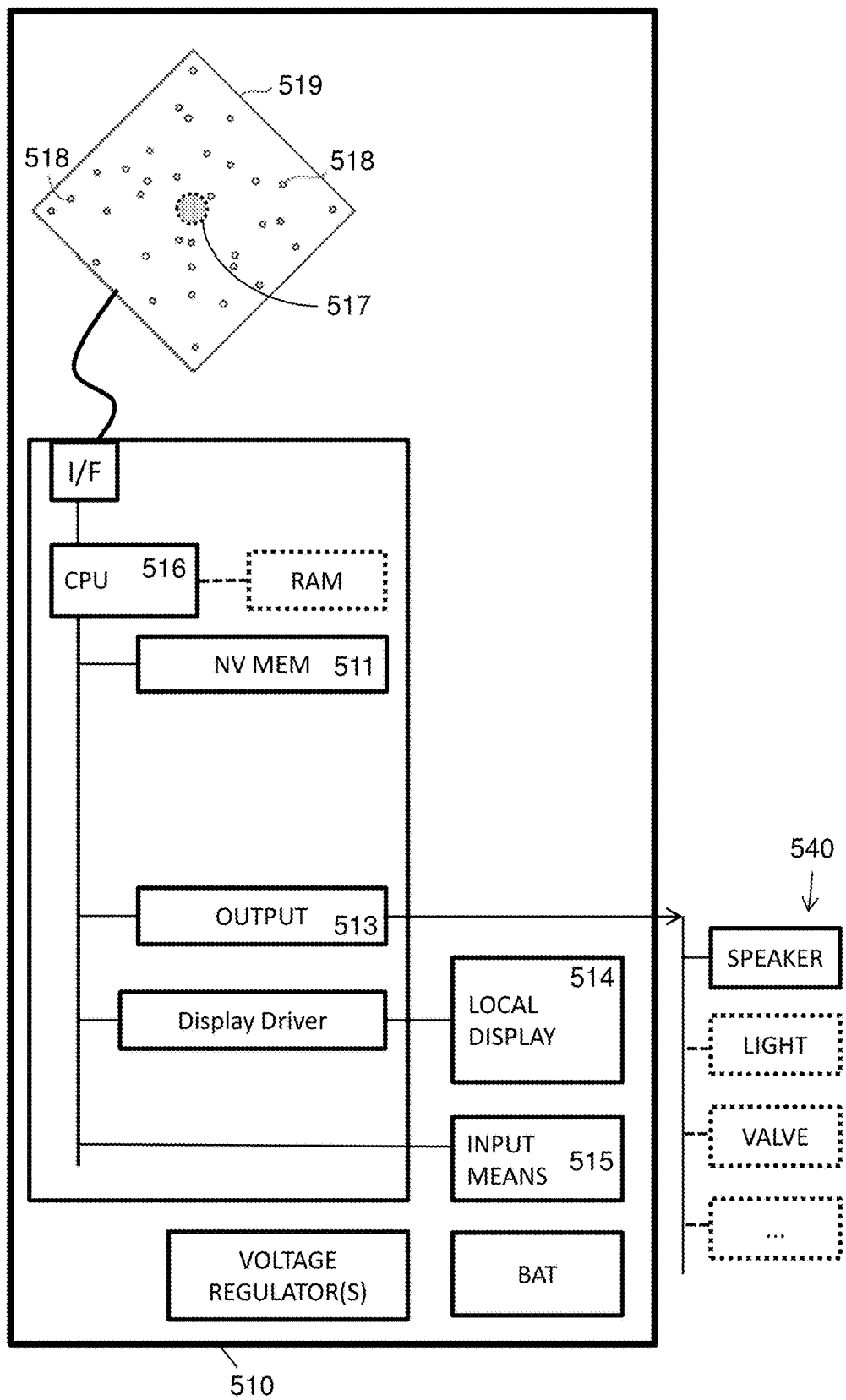
FIG. 5A shows a block-diagram of an illustrative system similar to that of FIG. 4, where the acoustic camera is configurable via a local display and local input means in a configuration mode and is configured for conditionally activating or deactivating one or more components via its output in a normal operation mode.
Figure 5B:
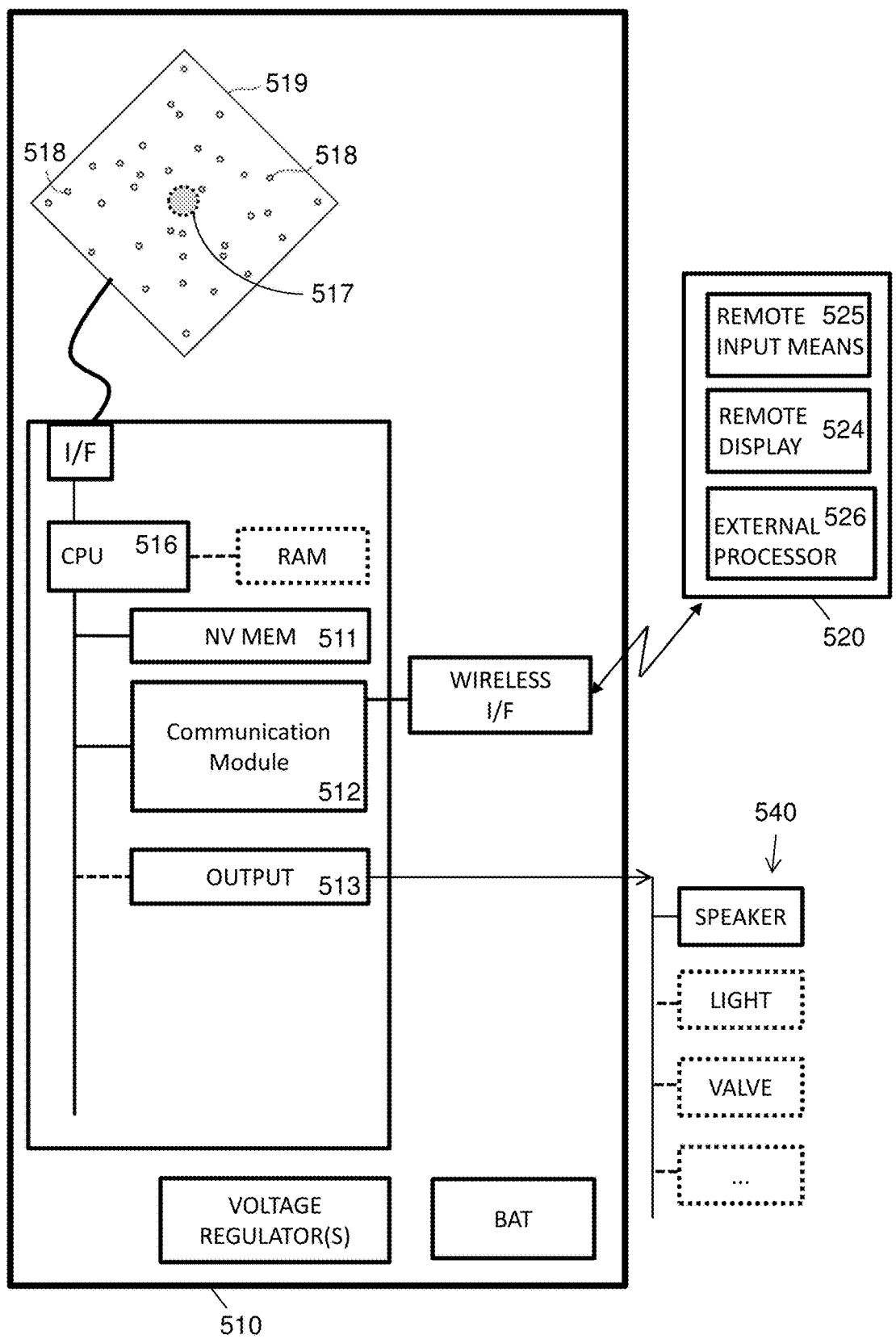
FIG. 5B shows a block-diagram of an illustrative system similar to that of FIG. 4, where the acoustic camera is configurable via a remote display and remote input means connected or connectable to the acoustic sensor device in a configuration mode and is configured for conditionally activating or deactivating one or more components via its output in a normal operation mode.

FIG. 5A and FIG. 5B illustrate an acoustic detection system 500, where the processor 516 of the acoustic camera 510 is configured for automatically controlling, directly or indirectly, at least one of the components 540, e.g. a speaker, when a sound source is detected that satisfies certain criteria, including at least the condition that the sound source has to be located in a Region of Interest.

FIG. 5A shows an example in which the Region(s) of Interest can be defined via the local input means 515 and the local display means 514 during a configuration mode; and where the processor 516 of the acoustic camera 510 is configured for directly controlling or driving at least one of the components 540 (in the example a speaker) via its output 513 during actual use of the acoustic camera. When comparing FIG. 4 and FIG. 5A, it can be seen that the configuration device 420 and the system controller 430 are omitted, and that the acoustic camera 510 functions mainly as a stand-alone device.

FIG. 5B shows an example in which the Region(s) of Interest can be defined via the input means 525 and the display means 524 of an external device 520 during a configuration mode, and then preferably stored in a non-volatile memory 511 of the acoustic camera; and where the processor 516 of the acoustic camera 510 is configured for obtaining the information about the Region(s) of Interest from the non-volatile memory 511, and is configured for controlling at least one of the components 540 (in the example a speaker) via its output 513 during actual use. When comparing FIG. 4 and FIG. 5B, it can be seen that the system controller 430 is omitted in FIG. 5B. The configuration device 520 is only required during initial configuration of the acoustic detection system and is no longer required during actual use of the system 500.

Figure 6:
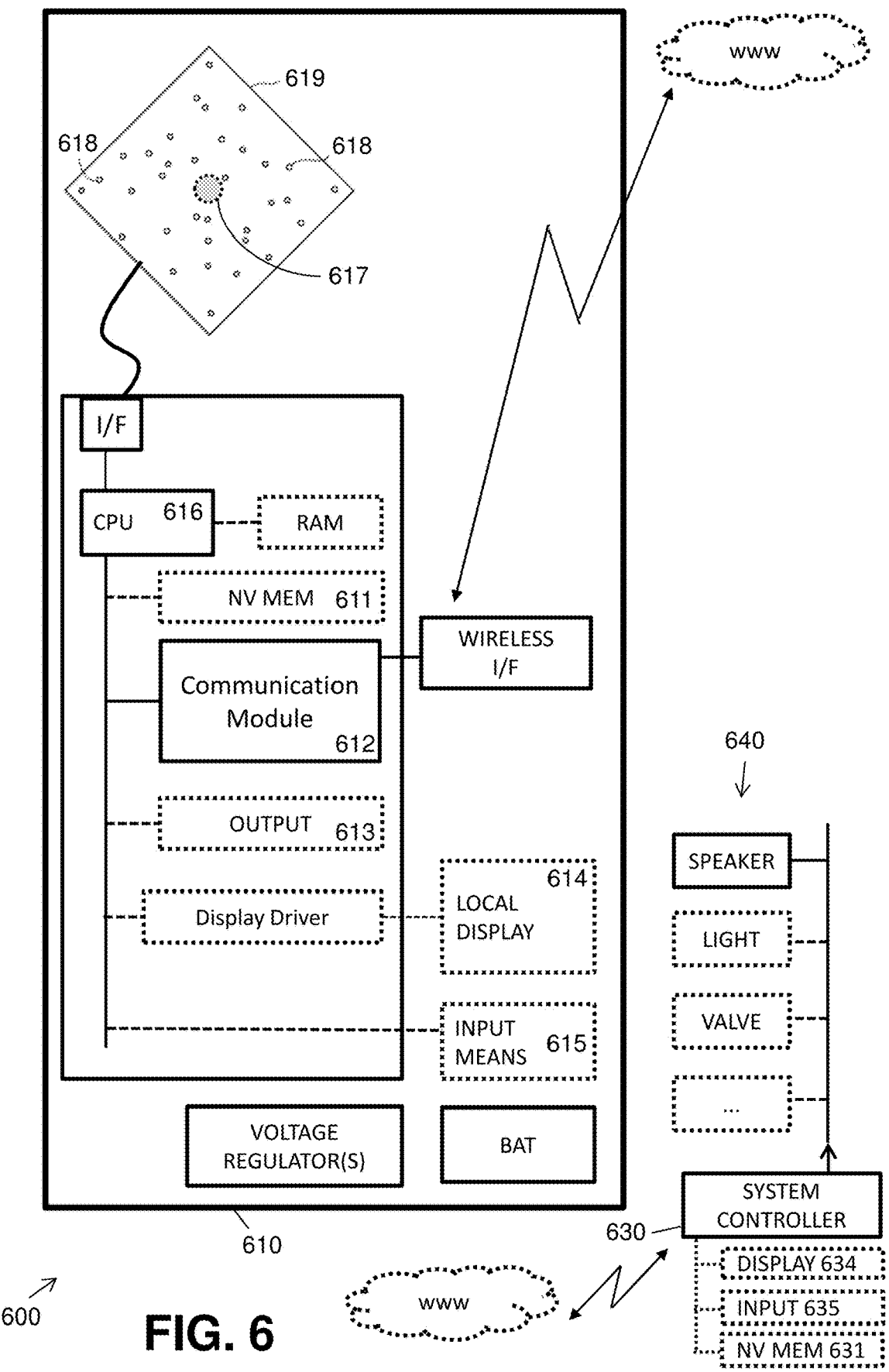
FIG. 6 shows a block-diagram of an illustrative system similar to that of FIG. 4, where the acoustic camera is configurable by a remote computer via its communication means in a configuration mode and is adapted for sending messages to a system controller for activating or deactivating one or more components in a normal operation mode. The regions of interest can be implemented inside the acoustic camera, or inside the system controller, or both.

FIG. 6 shows an acoustic detection system 600 where the acoustic camera 610 is communicatively connected to a system controller 630, for example wirelessly, via the internet, or wired (not shown) via a cable connection, or in any other suitable way. The system controller 630 may be situated at a remote location, e.g. in the control room of a plant surveillance system. The system 600 can be configured using input means 635 (e.g. a keyboard and a mouse) and display means 634 (e.g. an LCD display) connected to the system controller 630 (e.g. a desktop computer). The configuration information may be stored on the system controller 630 and may optionally be sent to the acoustic camera 610 and optionally be stored therein (e.g. in RAM after power-on, or in a non-volatile memory), although that is not absolutely required.

In an embodiment, the acoustic camera 610 is configured for testing if a detected sound source is situated in a Region of Interest. In this case, the acoustic camera 610 needs to know at least the position (or location) of at least one ROI. During normal use, the acoustic camera 610 may reject events related to sound sources which are not located in a Region of Interest.

In another embodiment, the system controller 630 is configured for testing if a detected sound source is situated in a Region Of Interest. In this case, the acoustic camera 610 does not require information about the Region(s) of Interest, but the acoustic camera has to submit at least location information of detected sound sources to the system controller 630, for allowing the system controller 630 to test if the detected sound source(s) is/are located in a ROI. Of course, the acoustic camera 610 may also send other information, such as e.g. an optical picture of the scene, sound pressure level information of the detected sound source(s), a sound fragment, a minimum detectable sound level, a sensitivity, etc.

As can be seen, in FIG. 6, the at least one component 640 may be physically connected to the system controller 630, but also in this case, the acoustic detection system 600 may be configured for automatically activating or deactivating at least one of said components 640 when a sound source is detected that satisfies certain criteria, including the criterion that the sound source has to be situated in a predefined ROI.

The system 500 of FIG. 5A and the system 600 of FIG. 6 may be seen as two extremes:
in FIG. 5A the test of whether or not a sound source is located in a ROI, and in response thereto, the conditional activation or deactivation of a component 540, are both performed by the acoustic camera itself;
in FIG. 6 the test of whether or not a sound source is located in a ROI, and in response thereto, the conditional activation or deactivation of a component 640, are both performed outside of the acoustic camera 610, namely by the system controller 630.

But the present invention is not limited to these extremes, and other solutions are also possible.

Figure 7:
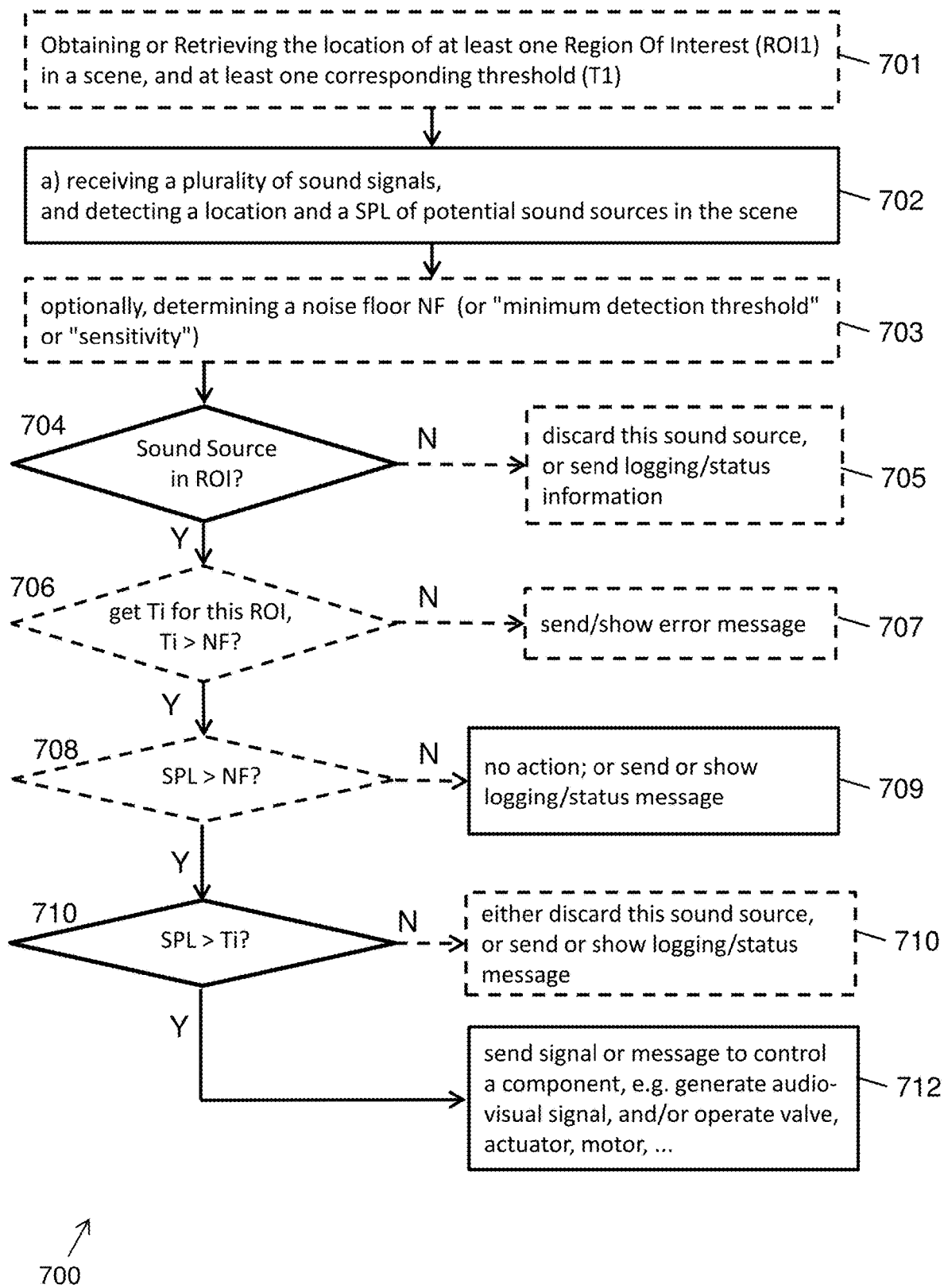
FIG. 7 shows a flow-chart of a method of detecting one or more sound sources, using at least one Region of Interest. This method may be performed for example by the system of FIG. 4, or by the acoustic sensor device of FIG. 5A.

FIG. 7 shows a flow-chart of a method 700 of detecting one or more sound sources, taking into account at least one Region Of Interest (ROI), as may be performed by any of the acoustic detection systems 400, 500, 600 of FIG. 4 to FIG. 6. The method may automatically control, e.g. activate or deactivate a component (e.g. a siren, a speaker, a lamp, a motor, an actuator, etc.) in response to the detection of a sound source, if certain conditions are met, including at least the condition that the sound source is located in the at least one Region of Interest.

The method 700 comprises the following steps:
a) receiving 702 a plurality of sound signals, and detecting a location and a sound pressure level (SPL) of one or more potential sound sources in the scene;

b) testing 704 if the location of the sound source is situated in at least one Region Of Interest ROI1, and testing 710 if the sound pressure level (SPL) is larger than at least one predefined threshold level T1 associated with said at least one Region of Interest ROI1, and if both conditions are true, to send 712 a signal (e.g. via an output port) and/or to send a message (e.g. via communication means) to control an external component (e.g. in order to generate an audio-visual signal, to open or close a valve, to control an actuator, to activate or deactivate a motor, etc.).

Optionally, the method may comprise an additional step 701 of obtaining (e.g. via the communication means or via input means) or retrieving (e.g. from RAM or from a non-volatile memory or from storage means) information about the location of the at least one Region of Interest ROI1, and the at least one threshold value T1 associated with that region.

Optionally, the method may further comprise a step 703 of determining a noise floor NF or a "minimum detectable sound pressure level" (also referred to as "sensitivity") of a sound source in that ROI, and may further comprise a step of testing 708 if the detected sound pressure level SPL of the detected sound source is larger than the determined noise floor NF or sensitivity, and to perform step 710 only if the SPL is larger than the NF. In case the sound pressure level SPL is lower than the noise floor NF, the method may discard 709 the sound source, or may display or send 709 a logging message or a status message or the like.

Optionally, the method may further test 706 if the threshold value T1 of the at least one Region of Interest ROI1 is larger than the noise floor NF and may optionally send or show 707 an error message if that is not the case.

In the system of FIG. 5A, all steps may be performed by the acoustic camera.

In the system of FIG. 6, steps 702 and 703 may be performed by the acoustic camera, and all other steps may be performed by the system controller 630.

But as mentioned above, other partitioning is also contemplated. For example, also in the system of FIG. 6, all steps may be performed by the acoustic camera, and the system controller 630 may be configured to actually activate or deactivate one or more of the components 640 in response to messages sent by the acoustic camera.

Of course, the method may also include additional steps, such as capturing an optical image, and transmitting the optical image, overlaying the optical image with textual information, capturing an audio fragment of a predefined duration, analysing the captured audio fragment, transmitting the captured audio fragment, etc. These additional steps may be performed at least once, or repeatedly. In this way the user or operator or the system may be provided with more functionality and/or more information, and hence the risk of false positives may be further reduced.

Figure 8:
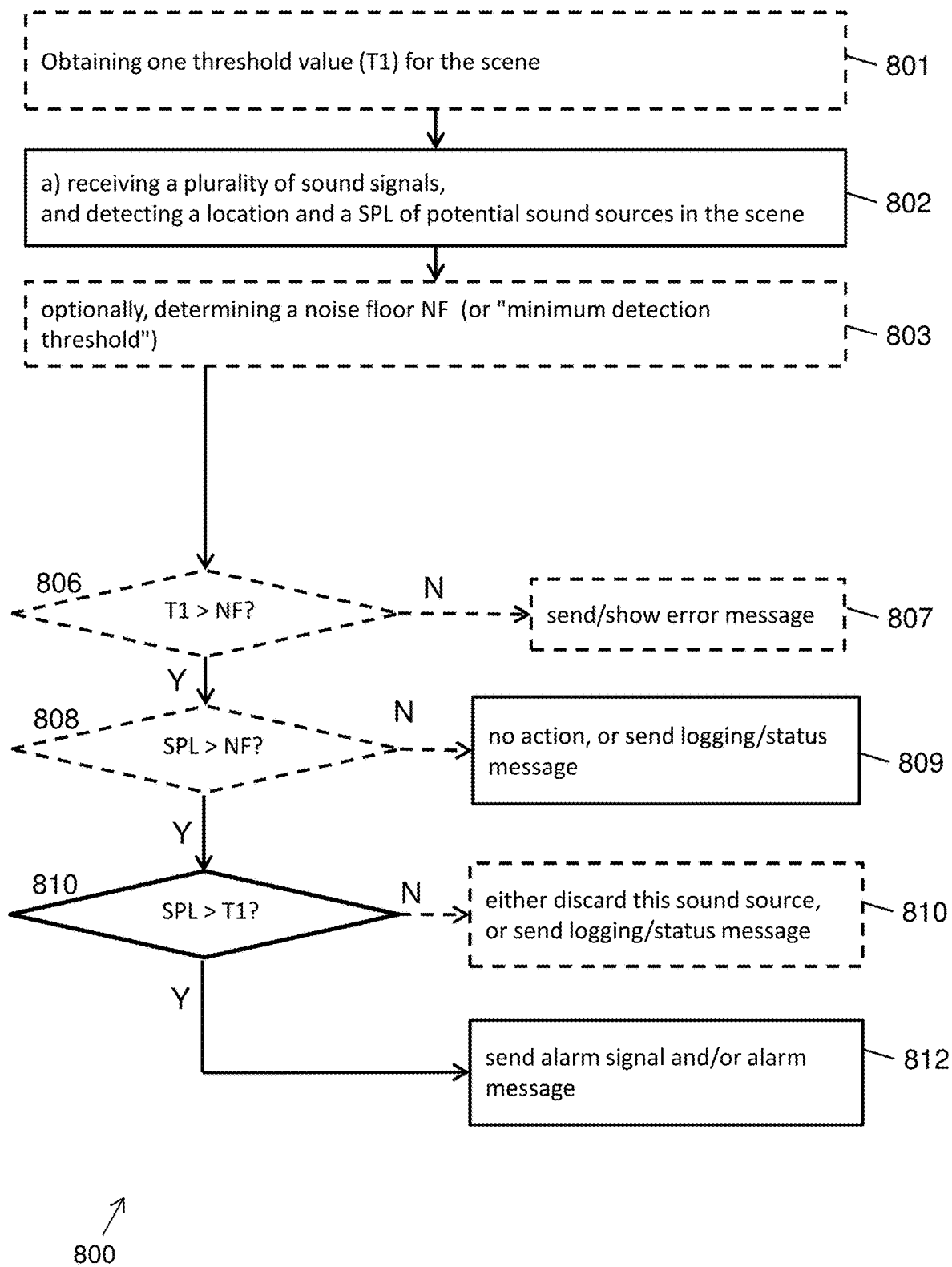
FIG. 8 shows a flow-chart of a method of detecting one or more sound sources, as may be performed by an acoustic camera without Regions of Interest. This method may be performed for example by the acoustic sensor device of FIG. 6.
Figure 9:
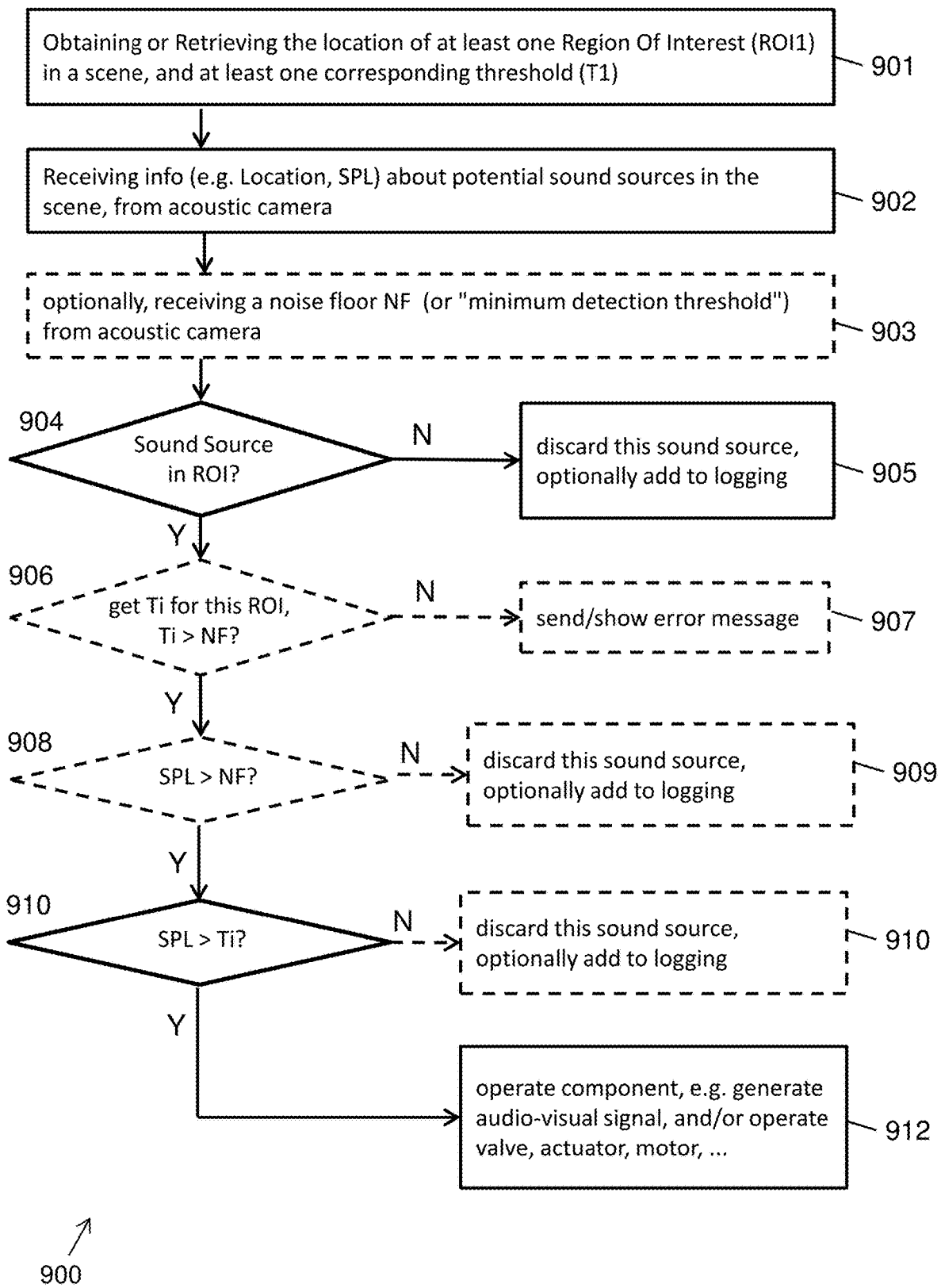
FIG. 9 shows a flow-chart of a method of detecting one or more sound sources and automatically taking appropriate action without human intervention. This method may be performed for example by the system controller of FIG. 6.

FIG. 8 shows a flow-chart of a method 800 which may be performed by an acoustic camera 610 of FIG. 6, unaware of Regions of Interest, e.g. an acoustic camera as described in WO2019166450(A1), and FIG. 9 shows a flow-chart of a method 900 which may be performed by a system controller 630 of FIG. 6, communicatively connected to the acoustic camera 610, and operatively connected to at least one component 640, and configured for processing information sent by the acoustic camera 610, in order to automatically, albeit conditionally, activate or deactivate said at least one component in response to certain messages.

As can be seen in FIG. 8, the acoustic camera 610 does not absolutely require any knowledge of Regions of Interest (although it may). It only needs to receive 802 a plurality of sound signals, and to detect a location of a potential sound source in the scene, and to determine a sound pressure level SPL of that sound source. In step 803, the acoustic camera 610 may detect one or more other parameters, such as e.g. a distance of the sound source, a sensitivity level or "noise floor", e.g. in the same way as described in WO2019166450 (A1), a likelihood that the acoustic signal is a gas leak signal (e.g. based on spectral analysis of an audio fragment), etc. In case a noise floor NF is determined, the acoustic camera would typically discard 809 sound sources having a sound pressure level SPL smaller than the noise floor NF but would send 812 an alarm signal or an alarm message if the sound pressure level SPL is found 806 to be larger than the noise floor NF, and if the sound pressure level SPL is found 810 to be larger than a predefined threshold level T1. In the flow-chart of FIG. 8 these tests are performed in different steps, but it is of course also possible to combine several comparisons in a single test.

As can be seen in FIG. 9, the system controller 630 would typically obtain or retrieve 901 the location of at least one Region of Interest ROI1, and at least one corresponding threshold value T1, and would receive 902 information from the acoustic camera 610 about potential sound sources in the scene (e.g. location information and a sound pressure level SPL), and would test 904 if the sound source is located in a Region of Interest, and if not, discard 905 this message, or optionally save the information for logging purposes.

If the sound source is located in a ROI, the system controller 630 would obtain the at least one threshold value Ti related to this ROI, and would test 910 if the sound pressure level SPL of this sound source is larger than said threshold Ti, and if the outcome of this test is true, would operate 912 at least one component (e.g. in order to generate an audio-visual signal, to open or close a valve, to activate or deactivate an actuator or a motor, etc.).

As indicated by dotted lines, the method 900 may comprise further steps, such as testing in step 908 if the sound pressure level SPL is larger than the noise floor NF, and if this is not the case, discarding 909 the message or optionally logging the message.

The method 900 may also comprise step 906 of testing if the threshold value Ti is larger than the noise floor NF, and if that is not the case, to send or to show an error message 907.

Finally, while FIG. 4 to FIG. 6 illustrate a few examples of hardware block-diagrams of acoustic detection devices and systems as proposed by the present invention, and FIG. 7 to FIG. 9 illustrate a few examples of methods of detecting an acoustic sound source (e.g. caused by a gas leak or by mechanical friction) as may be performed by these devices or systems, the following optional features are also contemplated:

in an embodiment, the acoustic camera may comprise a video camera, and may be configured for transmitting video images or a video stream of the scene. Such a camera may be used not only for gas leak detection, but also for security or surveillance;

in an embodiment, the acoustic camera may be further configured for flame detection, and for automatically taking appropriate action in case a flame is detected, e.g. by activating a fire extinguisher or activating a spraying device;

in an embodiment, the acoustic camera may be further configured for smoke detection, and for automatically taking appropriate action in case smoke is detected;

in an embodiment, the acoustic camera may further comprise an infrared camera, and for transmitting infrared images of the scene, e.g. periodically or upon request;

in an embodiment, the acoustic camera may further comprise a flame detector.

So far, the present invention was mainly explained in the context of detecting "gas leaks", or "mechanical wear", but the present invention is not limited thereto, and the present invention can also be used at locations where ultrasound sources are to be monitored, for example when ultrasound sources are the indication of a probable failure. In what follows, examples will be described where the present invention is used for detecting electrical degradation or electrical failures by monitoring electrical discharges.

Electrified equipment, in particular high-voltage equipment is susceptible to wear of their electrical insulators or electrified parts. Partial discharge occurs when charge carriers are able to find a path between different voltages or phases without going through the intended conductor(s). Undesired discharge paths may comprise surfaces, insulating materials, surrounding air. Electric discharges are known to produce various emissions, including sound and in particular ultrasound, e.g. cracking sound or noise. In particular embodiments of the present invention, the acoustic camera is configured for detecting (or identifying or recognizing) such a cracking sound (e.g. caused by a partial discharge or by sparks), and if detected, to determine the location of that sound source. Such detection may trigger a warning, or an alarm.

Depending on the location of the partial discharge, on the type of the material(s) where the discharge occurs, on the voltage (continuous, alternating, positive or negative), different types of partial discharges may occur, as is known by those skilled in the art. These different partial discharge types have different acoustic emissions, that can be separated by pre-defined rules or machine learning algorithms. An alarm specific to a region of interest could be triggered not only based on a threshold (that would be the sound power level of the partial discharge) but also on the result of a classification algorithm, that could output labels, with or without a confidence estimate. As described above, the acoustic level (e.g. sound pressure level) of a particular sound source, and the likelihood of being recognized as a sound wave that is caused by an electrical discharge, are to be compared with the one or more threshold levels defined for the region of interest in which the sound source is located, in order to trigger a warning or an alert or an alarm.

In a particular embodiment, a warning/an alarm is triggered if the sound source is situated in a particular ROI having a predefined first/second threshold level respectively, if the measure sound level is larger than said first/second threshold level, and if the probability of correctly identifying a cracking sound caused by an electrical discharge is higher than 30%, or higher than 40%, or higher than 50%.

The present invention can be used to define regions of interests, corresponding to areas or zones, for example different voltage areas (e.g 150 kV area, 220 kV area), where one or more threshold level(s) can be defined for sending a warning or an alert or an alarm, which threshold level(s) can moreover differ for each voltage domain.

The present invention can also be used to reduce or avoid false alarms by defining one or more regions of interest where for example partial discharges or electrical discharges usually occur, but without consequences, such as e.g. corona discharges occurring on metallic parts. These regions may be excluded from generating an alarm, e.g. by setting a relatively high threshold level. In order to define these regions of interest, a user could for example draw a region of interest around each insulator. In particular embodiments, image processing techniques are used to automatically detect the presence and the location of electric insulators (e.g. based on a known shape and/or size and/or color). In this way, a plurality of ROI (regions-of-interest) may be defined automatically or semi-automatically in software. Of course, in practice, an operator still needs to confirm the detected regions of interest, but a large portion of the work can be done automatically.

The invention claimed is:

1. An acoustic detection device comprising:
   a plurality of microphones spaced apart in at least two directions, and configured for converting acoustic waves originating from a scene into a plurality of analog or digital sound signals;
   an output for sending a signal to an external component, and/or
   a communication means for sending a message to an external processor;
   a memory storing information about a particular scene to be observed, an image of the scene being partitioned in a plurality of non-overlapping zones including at least two regions of interest smaller than the entire scene, said information including location information of the at least two regions of interest in the scene and at least two threshold levels, each of the at least two regions of interest being associated with a different one of the at least two threshold levels;
   a processing circuit connected to said microphones, to said output and/or to said communications means, and to said memory, and configured for:
   a) receiving the plurality of sound signals, and detecting a location and a sound pressure level (SPL) or a value derived therefrom of one or more potential localized sound sources in said scene; and
   b) for at least one detected localized sound source, testing if the localized detected sound source is situated in one of the at least two regions of interest; and testing if the detected Sound Pressure Level (SPL) or the value derived therefrom is higher than the threshold level associated with that region of interest; and
   if both conditions are satisfied, sending a first signal and/or a first message indicative of an alarm.

2. The acoustic detection device according to claim 1, further comprising:
   at least one optical camera configured for capturing at least one image of at least a portion of said scene; and
   wherein the acoustic detection device is further configured for transmitting at least one captured image.

3. The acoustic detection device according to claim 1, wherein each of the at least two threshold levels is a sound pressure level measurable by the plurality of microphones.

4. The acoustic detection device according to claim 1, wherein each of the at least two threshold levels is a gas leakage rate.

5. The acoustic detection device according to claim 1, wherein the acoustic detection device is further adapted for estimating a minimum detectable sound level for the at least two regions of interest; and
   wherein step a) further comprises: testing if the detected sound pressure level is larger than the minimum detectable sound level, and to continue with step b) only if an outcome of this test is true.

6. The acoustic detection device according to claim 1, further comprising a display and input means; and
   wherein the processing circuit is further configured for providing an image on said display, and for allowing an operator to define a location of said at least two regions of interest, and to specify said at least two threshold levels using said input means, each of the at least two regions of interest being associated with a different one of the at least two threshold levels.

7. A system comprising:
   an acoustic detection device according to claim 1, fixedly mounted to observe a scene to be monitored; and
   a display and input means external to but communicatively connected to the acoustic detection device; and
   wherein the processing circuit is further configured for providing an image on said display, and for allowing an operator to define a location of at least two regions of interest, and to specify at least two threshold levels using said input means, each of the at least two regions of interest being associated with a different one of the at least two threshold levels.

8. The system according to claim 7, further comprising at least one component operatively connected to the output of the acoustic detection device, and configured for receiving and being activated or deactivated in response to the first signal,
   wherein the component is selected from the group consisting of; an audio-visual component, a speaker, a siren, a light emitting device, an actuator, a motor, a valve, a relay.

9. The system comprising:
   an acoustic detection device according to claim 1, fixedly mounted to observe a scene; and
   at least one component selected from the group consisting of:
   an audio-visual component, a speaker, a siren, a light emitting device, an actuator, a motor, a valve, a relay;
   a system controller communicatively connected to the acoustic detection device, and operatively connected to said at least one component, and configured for receiving the first signal and/or the first message sent from the acoustic detection device or a message derived therefrom, and configured for selectively activating or deactivating the at least one component in response to the receipt of said message.

10. The system according to claim 9, further comprising a display and input means communicatively connected to the system controller; and
    wherein the system controller is further configured for sending an image to said display, and for allowing an operator to define a location of at least two regions of interest, and to specify at least two threshold levels using said input means, each of the at least two regions of interest being associated with a different one of the at least two threshold levels; and
    wherein the system controller is further configured for sending this location information and the threshold levels to the acoustic detection device.

11. A system comprising:
    an acoustic detection device fixedly mounted to observe a scene, the acoustic detection device comprising:
    a plurality of microphones spaced apart in at least two directions, and configured for converting acoustic waves originating from the scene into a plurality of analog or digital sound signals;

communication means for sending a message to a system controller;

a processing circuit configured for:
  a) receiving the plurality of sound signals, and detecting a location and a sound pressure level (SPL) or a value derived therefrom of one or more potential localized sound sources in said scene; and
  b) for at least one detected localized sound source, testing if the detected Sound Pressure Level or the value derived therefrom is higher than a predefined threshold; and if an outcome of this test is true, sending a message containing the detected location and the detected Sound Pressure level or the value derived therefrom to the system controller;

at least one component selected from the group consisting of: an audio-visual component, a speaker, a siren, a light emitting device, an actuator, a motor, a valve, a relay;

the system controller operatively connected to said at least one component, and communicatively connected to the acoustic detection device;

wherein the system controller further comprises storage means or a memory storing information about a particular scene to be observed, an image of the scene being partitioned in a plurality of non-overlapping zones including at least two regions of interest smaller than the entire scene, said information including location information of the at least two regions of interest in the scene and at least two threshold levels, each of the at least two regions of interest being associated with a different one of the at least two threshold levels;

the system controller is further configured for:
  x) receiving the message sent by the acoustic detection device, and extracting the location of the at least one localized sound source, and the detected Sound Pressure Level or the value derived therefrom;
  y) testing if the detected location of the detected localized sound source is situated in one of the at least two regions of interest, and testing if the detected Sound Pressure Level or the value derived therefrom is higher than the threshold level associated with that region of interest, and if both conditions are satisfied, selectively activating or deactivating the at least one component.

12. The system according to claim 11, wherein the acoustic detection device further comprises:
  at least one optical camera configured for capturing at least one image of at least a portion of said scene; and
  wherein the acoustic detection device is further configured for transmitting at least one captured image; and
  wherein the system comprises at least one display connected to or connectable to the system controller; and
  wherein the system is further configured for showing the at least one captured image on said display.

13. The system according to claim 11, wherein the system further comprises input means connected or connectable to the system controller; and
  wherein the system controller is further configured for allowing a user to define a location of the at least two regions of interest, and to specify the associated threshold level using said input means.

14. The system according to claim 11, wherein the acoustic detection device is further adapted for estimating a minimum detectable sound level for the at least two regions of interest; and
  wherein the acoustic detection device is further configured for testing if the detected sound pressure level (SPL) is larger than the minimum detectable sound level and for sending the message depending on an outcome of the test; and/or
  wherein the system controller is further configured for testing if the detected sound pressure level is larger than the minimum detectable sound level, and for activating or deactivating said component depending on the outcome of the test.

15. The system according to claim 11, wherein each of the at least two threshold levels is a gas leakage rate, and
  wherein the acoustic detection device or the system controller further comprises distance information for the at least two regions of interest, and
  wherein the acoustic detection device or the system controller is further configured for converting the detected sound pressure level into an estimated gas leakage rate; and
  wherein the acoustic detection device or the system controller is further configured for displaying the detected gas leakage rate on the display.

16. The acoustic detection device according to claim 2, wherein the acoustic detection device is further configured for transmitting the at least one captured image after overlaying the captured image with additional information.

17. The system according to claim 12, wherein the acoustic detection device is further configured for transmitting the at least one captured image after overlaying the captured image with additional information; and
  wherein the system is further configured for showing the at least one captured image overlaid with additional information on said display.

18. The system according to claim 14, wherein the acoustic detection device is further adapted for transmitting the minimum detectable sound level to the system controller.

\* \* \* \* \*